(12) United States Patent
Higashikawa et al.

(10) Patent No.: US 11,538,390 B2
(45) Date of Patent: Dec. 27, 2022

(54) IMAGE DISPLAY DEVICE, IMAGE DISPLAY SYSTEM, AND INSPECTION METHOD

(71) Applicant: JVCKENWOOD Corporation, Yokohama (JP)

(72) Inventors: Shingo Higashikawa, Yokohama (JP); Hiroshi Takeshita, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/388,698

(22) Filed: Jul. 29, 2021

(65) Prior Publication Data

US 2021/0358377 A1 Nov. 18, 2021

Related U.S. Application Data

(63) Continuation of application No. PCT/JP2019/044236, filed on Nov. 12, 2019.

(30) Foreign Application Priority Data

Jan. 31, 2019 (JP) .............................. JP2019-016110
Jan. 31, 2019 (JP) .............................. JP2019-016111
Jan. 31, 2019 (JP) .............................. JP2019-016112

(51) Int. Cl.
*G09G 3/20* (2006.01)
*G09G 3/00* (2006.01)

(52) U.S. Cl.
CPC ........... *G09G 3/2007* (2013.01); *G09G 3/006* (2013.01); *G09G 2320/0233* (2013.01); *G09G 2320/0271* (2013.01); *G09G 2320/0285* (2013.01)

(58) Field of Classification Search
CPC ................. G09G 3/2007; G09G 3/006; G09G 2320/0233; G09G 2320/0271; G09G 2320/0285; G09G 5/00; G09G 5/36; H04N 17/00
See application file for complete search history.

(56) References Cited

U.S. PATENT DOCUMENTS 6,693,642 B1    2/2004 Ogawa
2014/0035962 A1*    2/2014 Izumi ...................... G09G 3/30
                                                                            345/690

FOREIGN PATENT DOCUMENTS

JP      2001-034255 A    2/2001
WO      2004015679 A1    2/2004

* cited by examiner

*Primary Examiner* — Chad M Dicke
(74) *Attorney, Agent, or Firm* — Procopio, Cory, Hargreaves & Savitch LLP

(57) ABSTRACT

An image display device includes: an image signal reception unit configured to receive an image signal of a pattern image in which N partial images having a different gradation level value are regularly arranged; a conversion unit configured to convert a part of gradation level values included in the image signal in accordance with a predetermined conversion rule; and a display unit configured to display by using an image signal that undergoes conversion by the conversion unit. The conversion unit converts a gradation level value corresponding to a term of a predetermined arithmetic progression in accordance with the predetermined conversion rule.

3 Claims, 36 Drawing Sheets

| GRADATION LEVEL VALUE TO BE INPUT TO CONVERSION UNIT | 0 | 1 | 2 | 3 | 4 | ... | 252 | 253 | 254 | 255 |
|---|---|---|---|---|---|---|---|---|---|---|
| OFFSET VALUE | +128 | — | +128 | — | +128 | ... | +128 | — | +128 | — |
| GRADATION LEVEL VALUE TO BE OUTPUT BY CONVERSION UNIT | 128 | 1 | 130 | 3 | 132 | ... | 124 | 253 | 126 | 255 |

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 16 | 17 | 18 | 19 | 20 | 21 | 22 | 23 | 24 | 25 | 26 | 27 | 28 | 29 | 30 | 31 |
| 32 | 33 | 34 | 35 | 36 | 37 | 38 | 39 | 40 | 41 | 42 | 43 | 44 | 45 | 46 | 47 |
| 48 | 49 | 50 | 51 | 52 | 53 | 54 | 55 | 56 | 57 | 58 | 59 | 60 | 61 | 62 | 63 |
| 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 |
| 96 | 97 | 98 | 99 | 100 | 101 | 102 | 103 | 104 | 105 | 106 | 107 | 108 | 109 | 110 | 111 |
| 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 |
| 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 |
| 176 | 177 | 178 | 179 | 180 | 181 | 182 | 183 | 184 | 185 | 186 | 187 | 188 | 189 | 190 | 191 |
| 192 | 193 | 194 | 195 | 196 | 197 | 198 | 199 | 200 | 201 | 202 | 203 | 204 | 205 | 206 | 207 |
| 208 | 209 | 210 | 211 | 212 | 213 | 214 | 215 | 216 | 217 | 218 | 219 | 220 | 221 | 222 | 223 |
| 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 |

Fig. 2

| GRADATION LEVEL VALUE TO BE INPUT TO CONVERSION UNIT | 0 | 1 | 2 | 3 | 4 | ... | 252 | 253 | 254 | 255 |
|---|---|---|---|---|---|---|---|---|---|---|
| GRADATION LEVEL VALUE TO BE OUTPUT BY CONVERSION UNIT | 0 | 1 | 0 | 3 | 0 | ... | 0 | 253 | 0 | 255 |

Fig. 4

| 0 | 1 | 0 | 3 | 0 | 5 | 0 | 7 | 0 | 9 | 0 | 11 | 0 | 13 | 0 | 15 |
|---|---|---|---|---|---|---|---|---|---|---|---|---|---|---|---|
| 0 | 17 | 0 | 19 | 0 | 21 | 0 | 23 | 0 | 25 | 0 | 27 | 0 | 29 | 0 | 31 |
| 0 | 33 | 0 | 35 | 0 | 37 | 0 | 39 | 0 | 41 | 0 | 43 | 0 | 45 | 0 | 47 |
| 0 | 49 | 0 | 51 | 0 | 53 | 0 | 55 | 0 | 57 | 0 | 59 | 0 | 61 | 0 | 63 |
| 0 | 65 | 0 | 67 | 0 | 69 | 0 | 71 | 0 | 73 | 0 | 75 | 0 | 77 | 0 | 79 |
| 0 | 81 | 0 | 83 | 0 | 85 | 0 | 87 | 0 | 89 | 0 | 91 | 0 | 93 | 0 | 95 |
| 0 | 97 | 0 | 99 | 0 | 101 | 0 | 103 | 0 | 105 | 0 | 107 | 0 | 109 | 0 | 111 |
| 0 | 113 | 0 | 115 | 0 | 117 | 0 | 119 | 0 | 121 | 0 | 123 | 0 | 125 | 0 | 127 |
| 0 | 129 | 0 | 131 | 0 | 133 | 0 | 135 | 0 | 137 | 0 | 139 | 0 | 141 | 0 | 143 |
| 0 | 145 | 0 | 147 | 0 | 149 | 0 | 151 | 0 | 153 | 0 | 155 | 0 | 157 | 0 | 159 |
| 0 | 161 | 0 | 163 | 0 | 165 | 0 | 167 | 0 | 169 | 0 | 171 | 0 | 173 | 0 | 175 |
| 0 | 177 | 0 | 179 | 0 | 181 | 0 | 183 | 0 | 185 | 0 | 187 | 0 | 189 | 0 | 191 |
| 0 | 193 | 0 | 195 | 0 | 197 | 0 | 199 | 0 | 201 | 0 | 203 | 0 | 205 | 0 | 207 |
| 0 | 209 | 0 | 211 | 0 | 213 | 0 | 215 | 0 | 217 | 0 | 219 | 0 | 221 | 0 | 223 |
| 0 | 225 | 0 | 227 | 0 | 229 | 0 | 231 | 0 | 233 | 0 | 235 | 0 | 237 | 0 | 239 |
| 0 | 241 | 0 | 243 | 0 | 245 | 0 | 247 | 0 | 249 | 0 | 251 | 0 | 253 | 0 | 255 |

Fig. 5

| 0 | 1 | 0 | 3 | 0 | 5 | 0 | 7 | 0 | 9 | 0 | 11 | 0 | 13 | 0 | 15 |
|---|---|---|---|---|---|---|---|---|---|---|---|---|---|---|---|
| 0 | 17 | 0 | 19 | 0 | 0 | 23 | 0 | 25 | 0 | 27 | 0 | 29 | 0 | 31 | 0 |
| 33 | 0 | 35 | 0 | 37 | 0 | 39 | 0 | 41 | 0 | 43 | 0 | 45 | 0 | 47 | 0 |
| 49 | 0 | 51 | 0 | 53 | 0 | 55 | 0 | 57 | 0 | 59 | 0 | 61 | 0 | 63 | 0 |
| 65 | 0 | 67 | 0 | 69 | 0 | 71 | 0 | 73 | 0 | 75 | 0 | 77 | 0 | 79 | 0 |
| 81 | 0 | 83 | 0 | 85 | 0 | 87 | 0 | 89 | 0 | 91 | 0 | 0 | 95 | 0 | 97 |
| 0 | 99 | 0 | 101 | 0 | 103 | 0 | 105 | 0 | 107 | 0 | 109 | 0 | 111 | 0 | 113 |
| 0 | 115 | 0 | 117 | 0 | 119 | 0 | 121 | 0 | 123 | 0 | 125 | 0 | 127 | 0 | 129 |
| 0 | 131 | 0 | 133 | 0 | 135 | 0 | 137 | 0 | 139 | 0 | 141 | 0 | 143 | 0 | 145 |
| 0 | 147 | 0 | 149 | 0 | 151 | 0 | 153 | 0 | 155 | 0 | 157 | 0 | 159 | 0 | 161 |
| 0 | 163 | 0 | 0 | 167 | 0 | 169 | 0 | 171 | 0 | 173 | 0 | 175 | 0 | 177 | 0 |
| 179 | 0 | 181 | 0 | 183 | 0 | 185 | 0 | 187 | 0 | 189 | 0 | 191 | 0 | 193 | 0 |
| 195 | 0 | 197 | 0 | 199 | 0 | 201 | 0 | 203 | 0 | 205 | 0 | 207 | 0 | 209 | 0 |
| 211 | 0 | 213 | 0 | 215 | 0 | 217 | 0 | 219 | 0 | 221 | 0 | 223 | 0 | 225 | 0 |
| 227 | 0 | 229 | 0 | 231 | 0 | 233 | 0 | 235 | 0 | 0 | 239 | 0 | 241 | 0 | 243 |
| 0 | 245 | 0 | 247 | 0 | 249 | 0 | 251 | 0 | 253 | 0 | 255 | 0 | | | |

Fig. 7

| 0 | 16 | 32 | 48 | 64 | 80 | 96 | 112 | 128 | 144 | 160 | 176 | 192 | 208 | 224 | 240 |
|---|---|---|---|---|---|---|---|---|---|---|---|---|---|---|---|
| 1 | 17 | 33 | 49 | 65 | 81 | 97 | 113 | 129 | 145 | 161 | 177 | 193 | 209 | 225 | 241 |
| 2 | 18 | 34 | 50 | 66 | 82 | 98 | 114 | 130 | 146 | 162 | 178 | 194 | 210 | 226 | 242 |
| 3 | 19 | 35 | 51 | 67 | 83 | 99 | 115 | 131 | 147 | 163 | 179 | 195 | 211 | 227 | 243 |
| 4 | 20 | 36 | 52 | 68 | 84 | 100 | 116 | 132 | 148 | 164 | 180 | 196 | 212 | 228 | 244 |
| 5 | 21 | 37 | 53 | 69 | 85 | 101 | 117 | 133 | 149 | 165 | 181 | 197 | 213 | 229 | 245 |
| 6 | 22 | 38 | 54 | 70 | 86 | 102 | 118 | 134 | 150 | 166 | 182 | 198 | 214 | 230 | 246 |
| 7 | 23 | 39 | 55 | 71 | 87 | 103 | 119 | 135 | 151 | 167 | 183 | 199 | 215 | 231 | 247 |
| 8 | 24 | 40 | 56 | 72 | 88 | 104 | 120 | 136 | 152 | 168 | 184 | 200 | 216 | 232 | 248 |
| 9 | 25 | 41 | 57 | 73 | 89 | 105 | 121 | 137 | 153 | 169 | 185 | 201 | 217 | 233 | 249 |
| 10 | 26 | 42 | 58 | 74 | 90 | 106 | 122 | 138 | 154 | 170 | 186 | 202 | 218 | 234 | 250 |
| 11 | 27 | 43 | 59 | 75 | 91 | 107 | 123 | 139 | 155 | 171 | 187 | 203 | 219 | 235 | 251 |
| 12 | 28 | 44 | 60 | 76 | 92 | 108 | 124 | 140 | 156 | 172 | 188 | 204 | 220 | 236 | 252 |
| 13 | 29 | 45 | 61 | 77 | 93 | 109 | 125 | 141 | 157 | 173 | 189 | 205 | 221 | 237 | 253 |
| 14 | 30 | 46 | 62 | 78 | 94 | 110 | 126 | 142 | 158 | 174 | 190 | 206 | 222 | 238 | 254 |
| 15 | 31 | 47 | 63 | 79 | 95 | 111 | 127 | 143 | 159 | 175 | 191 | 207 | 223 | 239 | 255 |

Fig. 9

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 1 | 17 | 33 | 49 | 65 | 81 | 97 | 113 | 129 | 145 | 161 | 177 | 193 | 209 | 225 | 241 |
| 0 | 0 | 0 | 0 | 0 | 0 | 0 | 0 | 0 | 0 | 0 | 0 | 0 | 0 | 0 | 0 |
| 3 | 19 | 35 | 51 | 67 | 83 | 99 | 115 | 131 | 147 | 163 | 179 | 195 | 211 | 227 | 243 |
| 0 | 0 | 0 | 0 | 0 | 0 | 0 | 0 | 0 | 0 | 0 | 0 | 0 | 0 | 0 | 0 |
| 5 | 21 | 37 | 53 | 69 | 85 | 101 | 117 | 133 | 149 | 165 | 181 | 197 | 213 | 229 | 245 |
| 0 | 0 | 0 | 0 | 0 | 0 | 0 | 0 | 0 | 0 | 0 | 0 | 0 | 0 | 0 | 0 |
| 7 | 23 | 39 | 55 | 71 | 87 | 103 | 119 | 135 | 151 | 167 | 183 | 199 | 215 | 231 | 247 |
| 0 | 0 | 0 | 0 | 0 | 0 | 0 | 0 | 0 | 0 | 0 | 0 | 0 | 0 | 0 | 0 |
| 9 | 25 | 41 | 57 | 73 | 89 | 105 | 121 | 137 | 153 | 169 | 185 | 201 | 217 | 233 | 249 |
| 0 | 0 | 0 | 0 | 0 | 0 | 0 | 0 | 0 | 0 | 0 | 0 | 0 | 0 | 0 | 0 |
| 11 | 27 | 43 | 59 | 75 | 91 | 107 | 123 | 139 | 155 | 171 | 187 | 203 | 219 | 235 | 251 |
| 0 | 0 | 0 | 0 | 0 | 0 | 0 | 0 | 0 | 0 | 0 | 0 | 0 | 0 | 0 | 0 |
| 13 | 29 | 45 | 61 | 77 | 93 | 109 | 125 | 141 | 157 | 173 | 189 | 205 | 221 | 237 | 253 |
| 0 | 0 | 0 | 0 | 0 | 0 | 0 | 0 | 0 | 0 | 0 | 0 | 0 | 0 | 0 | 0 |
| 15 | 31 | 47 | 63 | 79 | 95 | 111 | 127 | 143 | 159 | 175 | 191 | 207 | 223 | 239 | 255 |

Fig. 10

| 0 | 0 | 33 | 49 | 65 | 81 | 0 | 0 | 0 | 0 | 0 | 179 | 195 | 211 | 227 | 0 |
|---|---|---|---|---|---|---|---|---|---|---|---|---|---|---|---|
| 1 | 17 | 0 | 0 | 0 | 0 | 99 | 115 | 131 | 147 | 163 | 0 | 0 | 0 | 0 | 245 |
| 0 | 0 | 35 | 51 | 67 | 83 | 0 | 0 | 0 | 0 | 0 | 181 | 197 | 213 | 229 | 0 |
| 3 | 19 | 0 | 0 | 0 | 0 | 101 | 117 | 133 | 149 | 0 | 0 | 0 | 0 | 0 | 247 |
| 0 | 0 | 37 | 53 | 69 | 85 | 0 | 0 | 0 | 0 | 167 | 183 | 199 | 215 | 231 | 0 |
| 5 | 0 | 0 | 0 | 0 | 0 | 103 | 119 | 135 | 151 | 0 | 0 | 0 | 0 | 0 | 249 |
| 0 | 23 | 39 | 55 | 71 | 87 | 0 | 0 | 0 | 0 | 169 | 185 | 201 | 217 | 233 | 0 |
| 7 | 0 | 0 | 0 | 0 | 0 | 105 | 121 | 137 | 153 | 0 | 0 | 0 | 0 | 0 | 251 |
| 0 | 25 | 41 | 57 | 73 | 89 | 0 | 0 | 0 | 0 | 171 | 187 | 203 | 219 | 235 | 0 |
| 9 | 0 | 0 | 0 | 0 | 0 | 107 | 123 | 139 | 155 | 0 | 0 | 0 | 0 | 0 | 253 |
| 0 | 27 | 43 | 59 | 75 | 91 | 0 | 0 | 0 | 0 | 173 | 189 | 205 | 221 | 0 | 0 |
| 11 | 0 | 0 | 0 | 0 | 0 | 109 | 125 | 141 | 157 | 0 | 0 | 0 | 0 | 239 | 255 |
| 0 | 29 | 45 | 61 | 77 | 0 | 0 | 0 | 0 | 0 | 175 | 191 | 207 | 223 | 0 | 0 |
| 13 | 0 | 0 | 0 | 0 | 95 | 111 | 127 | 143 | 159 | 0 | 0 | 0 | 0 | 241 | |
| 0 | 31 | 47 | 63 | 79 | 0 | 0 | 0 | 0 | 0 | 177 | 193 | 209 | 225 | 0 | |
| 15 | 0 | 0 | 0 | 0 | 97 | 113 | 129 | 145 | 161 | 0 | 0 | 0 | 0 | 243 | |

Fig. 12

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 |
| 32 | 33 | 34 | 35 | 36 | 37 | 38 | 39 | 40 | 41 | 42 | 43 | 44 | 45 | 46 | 47 |
| 63 | 62 | 61 | 60 | 59 | 58 | 57 | 56 | 55 | 54 | 53 | 52 | 51 | 50 | 49 | 48 |
| 64 | 65 | 66 | 67 | 68 | 69 | 70 | 71 | 72 | 73 | 74 | 75 | 76 | 77 | 78 | 79 |
| 95 | 94 | 93 | 92 | 91 | 90 | 89 | 88 | 87 | 86 | 85 | 84 | 83 | 82 | 81 | 80 |
| 96 | 97 | 98 | 99 | 100 | 101 | 102 | 103 | 104 | 105 | 106 | 107 | 108 | 109 | 110 | 111 |
| 127 | 126 | 125 | 124 | 123 | 122 | 121 | 120 | 119 | 118 | 117 | 116 | 115 | 114 | 113 | 112 |
| 128 | 129 | 130 | 131 | 132 | 133 | 134 | 135 | 136 | 137 | 138 | 139 | 140 | 141 | 142 | 143 |
| 159 | 158 | 157 | 156 | 155 | 154 | 153 | 152 | 151 | 150 | 149 | 148 | 147 | 146 | 145 | 144 |
| 160 | 161 | 162 | 163 | 164 | 165 | 166 | 167 | 168 | 169 | 170 | 171 | 172 | 173 | 174 | 175 |
| 191 | 190 | 189 | 188 | 187 | 186 | 185 | 184 | 183 | 182 | 181 | 180 | 179 | 178 | 177 | 176 |
| 192 | 193 | 194 | 195 | 196 | 197 | 198 | 199 | 200 | 201 | 202 | 203 | 204 | 205 | 206 | 207 |
| 223 | 222 | 221 | 220 | 219 | 218 | 217 | 216 | 215 | 214 | 213 | 212 | 211 | 210 | 209 | 208 |
| 224 | 225 | 226 | 227 | 228 | 229 | 230 | 231 | 232 | 233 | 234 | 235 | 236 | 237 | 238 | 239 |
| 255 | 254 | 253 | 252 | 251 | 250 | 249 | 248 | 247 | 246 | 245 | 244 | 243 | 242 | 241 | 240 |

Fig. 14

| 0 | 1 | 0 | 3 | 0 | 5 | 0 | 7 | 0 | 9 | 0 | 11 | 0 | 13 | 0 | 15 |
|---|---|---|---|---|---|---|---|---|---|---|---|---|---|---|---|
| 31 | 0 | 29 | 0 | 27 | 0 | 25 | 0 | 23 | 0 | 21 | 0 | 19 | 0 | 17 | 0 |
| 0 | 33 | 0 | 35 | 0 | 37 | 0 | 39 | 0 | 41 | 0 | 43 | 0 | 45 | 0 | 47 |
| 63 | 0 | 61 | 0 | 59 | 0 | 57 | 0 | 55 | 0 | 53 | 0 | 51 | 0 | 49 | 0 |
| 0 | 65 | 0 | 67 | 0 | 69 | 0 | 71 | 0 | 73 | 0 | 75 | 0 | 77 | 0 | 79 |
| 95 | 0 | 93 | 0 | 91 | 0 | 89 | 0 | 87 | 0 | 85 | 0 | 83 | 0 | 81 | 0 |
| 0 | 97 | 0 | 99 | 0 | 101 | 0 | 103 | 0 | 105 | 0 | 107 | 0 | 109 | 0 | 111 |
| 127 | 0 | 125 | 0 | 123 | 0 | 121 | 0 | 119 | 0 | 117 | 0 | 115 | 0 | 113 | 0 |
| 0 | 129 | 0 | 131 | 0 | 133 | 0 | 135 | 0 | 137 | 0 | 139 | 0 | 141 | 0 | 143 |
| 159 | 0 | 157 | 0 | 155 | 0 | 153 | 0 | 151 | 0 | 149 | 0 | 147 | 0 | 145 | 0 |
| 0 | 161 | 0 | 163 | 0 | 165 | 0 | 167 | 0 | 169 | 0 | 171 | 0 | 173 | 0 | 175 |
| 191 | 0 | 189 | 0 | 187 | 0 | 185 | 0 | 183 | 0 | 181 | 0 | 179 | 0 | 177 | 0 |
| 0 | 193 | 0 | 195 | 0 | 197 | 0 | 199 | 0 | 201 | 0 | 203 | 0 | 205 | 0 | 207 |
| 223 | 0 | 221 | 0 | 219 | 0 | 217 | 0 | 215 | 0 | 213 | 0 | 211 | 0 | 209 | 0 |
| 0 | 225 | 0 | 227 | 0 | 229 | 0 | 231 | 0 | 233 | 0 | 235 | 0 | 237 | 0 | 239 |
| 255 | 0 | 253 | 0 | 251 | 0 | 249 | 0 | 247 | 0 | 245 | 0 | 243 | 0 | 241 | 0 |

Fig. 15

| 0 | 1 | 0 | 3 | 0 | 5 | 0 | 7 | 0 | 9 | 0 | 11 | 0 | 13 | 0 | 15 |
|---|---|---|---|---|---|---|---|---|---|---|---|---|---|---|---|
| 0 | 31 | 0 | 29 | 0 | 27 | 0 | 25 | 0 | 23 | 0 | 0 | 19 | 0 | 17 | 0 |
| 33 | 0 | 35 | 0 | 37 | 0 | 39 | 0 | 41 | 0 | 43 | 0 | 45 | 0 | 47 | 0 |
| 0 | 63 | 0 | 61 | 0 | 59 | 0 | 57 | 0 | 55 | 0 | 53 | 0 | 51 | 0 | 49 |
| 65 | 0 | 67 | 0 | 69 | 0 | 71 | 0 | 73 | 0 | 75 | 0 | 77 | 0 | 79 | 0 |
| 97 | 0 | 95 | 0 | 0 | 91 | 0 | 89 | 0 | 87 | 0 | 85 | 0 | 83 | 0 | 81 |
| 0 | 99 | 0 | 101 | 0 | 103 | 0 | 105 | 0 | 107 | 0 | 109 | 0 | 111 | 0 | 113 |
| 129 | 0 | 127 | 0 | 125 | 0 | 123 | 0 | 121 | 0 | 119 | 0 | 117 | 0 | 115 | 0 |
| 0 | 131 | 0 | 133 | 0 | 135 | 0 | 137 | 0 | 139 | 0 | 141 | 0 | 143 | 0 | 145 |
| 161 | 0 | 159 | 0 | 157 | 0 | 155 | 0 | 153 | 0 | 151 | 0 | 149 | 0 | 147 | 0 |
| 0 | 163 | 0 | 0 | 167 | 0 | 169 | 0 | 171 | 0 | 173 | 0 | 175 | 0 | 177 | 0 |
| 0 | 193 | 0 | 191 | 0 | 189 | 0 | 187 | 0 | 185 | 0 | 183 | 0 | 181 | 0 | 179 |
| 195 | 0 | 197 | 0 | 199 | 0 | 201 | 0 | 203 | 0 | 205 | 0 | 207 | 0 | 209 | 0 |
| 0 | 225 | 0 | 223 | 0 | 221 | 0 | 219 | 0 | 217 | 0 | 215 | 0 | 213 | 0 | 211 |
| 227 | 0 | 229 | 0 | 231 | 0 | 233 | 0 | 235 | 0 | 0 | 239 | 0 | 241 | 0 | 243 |
|  |  |  | 255 | 0 | 253 | 0 | 251 | 0 | 249 | 0 | 247 | 0 | 245 | 0 |  |

Fig. 17

| GRADATION LEVEL VALUE TO BE INPUT TO CONVERSION UNIT | 0 | 1 | 2 | 3 | 4 | ... | 252 | 253 | 254 | 255 |
|---|---|---|---|---|---|---|---|---|---|---|
| OFFSET VALUE | +128 | — | +128 | — | +128 | ... | +128 | — | +128 | — |
| GRADATION LEVEL VALUE TO BE OUTPUT BY CONVERSION UNIT | 128 | 1 | 130 | 3 | 132 | ... | 124 | 253 | 126 | 255 |

Fig. 24

| 128 | 1 | 130 | 3 | 132 | 5 | 134 | 7 | 136 | 9 | 138 | 11 | 140 | 13 | 142 | 15 |
|---|---|---|---|---|---|---|---|---|---|---|---|---|---|---|---|
| 144 | 17 | 146 | 19 | 148 | 21 | 150 | 23 | 152 | 25 | 154 | 27 | 156 | 29 | 158 | 31 |
| 160 | 33 | 162 | 35 | 164 | 37 | 166 | 39 | 168 | 41 | 170 | 43 | 172 | 45 | 174 | 47 |
| 176 | 49 | 178 | 51 | 180 | 53 | 182 | 55 | 184 | 57 | 186 | 59 | 188 | 61 | 190 | 63 |
| 192 | 65 | 194 | 67 | 196 | 69 | 198 | 71 | 200 | 73 | 202 | 75 | 204 | 77 | 206 | 79 |
| 208 | 81 | 210 | 83 | 212 | 85 | 214 | 87 | 216 | 89 | 218 | 91 | 220 | 93 | 222 | 95 |
| 224 | 97 | 226 | 99 | 228 | 101 | 230 | 103 | 232 | 105 | 234 | 107 | 236 | 109 | 238 | 111 |
| 240 | 113 | 242 | 115 | 244 | 117 | 246 | 119 | 248 | 121 | 250 | 123 | 252 | 125 | 254 | 127 |
| 0 | 129 | 2 | 131 | 4 | 133 | 6 | 135 | 8 | 137 | 10 | 139 | 12 | 141 | 14 | 143 |
| 16 | 145 | 18 | 147 | 20 | 149 | 22 | 151 | 24 | 153 | 26 | 155 | 28 | 157 | 30 | 159 |
| 32 | 161 | 34 | 163 | 36 | 165 | 38 | 167 | 40 | 169 | 42 | 171 | 44 | 173 | 46 | 175 |
| 48 | 177 | 50 | 179 | 52 | 181 | 54 | 183 | 56 | 185 | 58 | 187 | 60 | 189 | 62 | 191 |
| 64 | 193 | 66 | 195 | 68 | 197 | 70 | 199 | 72 | 201 | 74 | 203 | 76 | 205 | 78 | 207 |
| 80 | 209 | 82 | 211 | 84 | 213 | 86 | 215 | 88 | 217 | 90 | 219 | 92 | 221 | 94 | 223 |
| 96 | 225 | 98 | 227 | 100 | 229 | 102 | 231 | 104 | 233 | 106 | 235 | 108 | 237 | 110 | 239 |
| 112 | 241 | 114 | 243 | 116 | 245 | 118 | 247 | 120 | 249 | 122 | 251 | 124 | 253 | 126 | 255 |

Fig. 25

| GRADATION LEVEL VALUE TO BE INPUT TO CONVERSION UNIT | 0 | 1 | 2 | 3 | ... | 126 | 127 | 128 | 129 | ... | 252 | 253 | 254 | 255 |
|---|---|---|---|---|---|---|---|---|---|---|---|---|---|---|
| GRADATION LEVEL VALUE TO BE OUTPUT BY CONVERSION UNIT | 255 | 1 | 255 | 3 | ... | 255 | 127 | 0 | 129 | ... | 0 | 253 | 0 | 255 |

Fig. 27

| 255 | 1 | 255 | 3 | 255 | 5 | 255 | 7 | 255 | 9 | 255 | 11 | 255 | 13 | 255 | 15 |
|---|---|---|---|---|---|---|---|---|---|---|---|---|---|---|---|
| 255 | 17 | 255 | 19 | 255 | 21 | 255 | 23 | 255 | 25 | 255 | 27 | 255 | 29 | 255 | 31 |
| 255 | 33 | 255 | 35 | 255 | 37 | 255 | 39 | 255 | 41 | 255 | 43 | 255 | 45 | 255 | 47 |
| 255 | 49 | 255 | 51 | 255 | 53 | 255 | 55 | 255 | 57 | 255 | 59 | 255 | 61 | 255 | 63 |
| 255 | 65 | 255 | 67 | 255 | 69 | 255 | 71 | 255 | 73 | 255 | 75 | 255 | 77 | 255 | 79 |
| 255 | 81 | 255 | 83 | 255 | 85 | 255 | 87 | 255 | 89 | 255 | 91 | 255 | 93 | 255 | 95 |
| 255 | 97 | 255 | 99 | 255 | 101 | 255 | 103 | 255 | 105 | 255 | 107 | 255 | 109 | 255 | 111 |
| 255 | 113 | 255 | 115 | 255 | 117 | 255 | 119 | 255 | 121 | 255 | 123 | 255 | 125 | 255 | 127 |
| 0 | 129 | 0 | 131 | 0 | 133 | 0 | 135 | 0 | 137 | 0 | 139 | 0 | 141 | 0 | 143 |
| 0 | 145 | 0 | 147 | 0 | 149 | 0 | 151 | 0 | 153 | 0 | 155 | 0 | 157 | 0 | 159 |
| 0 | 161 | 0 | 163 | 0 | 165 | 0 | 167 | 0 | 169 | 0 | 171 | 0 | 173 | 0 | 175 |
| 0 | 177 | 0 | 179 | 0 | 181 | 0 | 183 | 0 | 185 | 0 | 187 | 0 | 189 | 0 | 191 |
| 0 | 193 | 0 | 195 | 0 | 197 | 0 | 199 | 0 | 201 | 0 | 203 | 0 | 205 | 0 | 207 |
| 0 | 209 | 0 | 211 | 0 | 213 | 0 | 215 | 0 | 217 | 0 | 219 | 0 | 221 | 0 | 223 |
| 0 | 225 | 0 | 227 | 0 | 229 | 0 | 231 | 0 | 233 | 0 | 235 | 0 | 237 | 0 | 239 |
| 0 | 241 | 0 | 243 | 0 | 245 | 0 | 247 | 0 | 249 | 0 | 251 | 0 | 253 | 0 | 255 |

Fig. 28

| GRADATION LEVEL VALUE TO BE INPUT TO CONVERSION UNIT | 0 | 1 | 2 | 3 | 4 | ... | 252 | 253 | 254 | 255 |
|---|---|---|---|---|---|---|---|---|---|---|
| GRADATION LEVEL VALUE TO BE OUTPUT BY CONVERSION UNIT | 0 | 255 | 0 | 255 | 0 | ... | 0 | 255 | 0 | 255 |

Fig. 30

| GRADATION LEVEL VALUE TO BE INPUT TO CONVERSION UNIT | 0 | 1 | 2 | 3 | 4 | ... | 252 | 253 | 254 | 255 |
|---|---|---|---|---|---|---|---|---|---|---|
| OFFSET VALUE | -64 | +64 | -64 | +64 | -64 | ... | -64 | +64 | -64 | +64 |
| GRADATION LEVEL VALUE TO BE OUTPUT BY CONVERSION UNIT | 192 | 65 | 194 | 67 | 196 | ... | 188 | 61 | 190 | 63 |

Fig. 32

| 192 | 65 | 194 | 67 | 196 | 69 | 198 | 71 | 200 | 73 | 202 | 75 | 204 | 77 | 206 | 79 |
|---|---|---|---|---|---|---|---|---|---|---|---|---|---|---|---|
| 208 | 81 | 210 | 83 | 212 | 85 | 214 | 87 | 216 | 89 | 218 | 91 | 220 | 93 | 222 | 95 |
| 224 | 97 | 226 | 99 | 228 | 101 | 230 | 103 | 232 | 105 | 234 | 107 | 236 | 109 | 238 | 111 |
| 240 | 113 | 242 | 115 | 244 | 117 | 246 | 119 | 248 | 121 | 250 | 123 | 252 | 125 | 254 | 127 |
| 0 | 129 | 2 | 131 | 4 | 133 | 6 | 135 | 8 | 137 | 10 | 139 | 12 | 141 | 14 | 143 |
| 16 | 145 | 18 | 147 | 20 | 149 | 22 | 151 | 24 | 153 | 26 | 155 | 28 | 157 | 30 | 159 |
| 32 | 161 | 34 | 163 | 36 | 165 | 38 | 167 | 40 | 169 | 42 | 171 | 44 | 173 | 46 | 175 |
| 48 | 177 | 50 | 179 | 52 | 181 | 54 | 183 | 56 | 185 | 58 | 187 | 60 | 189 | 62 | 191 |
| 64 | 193 | 66 | 195 | 68 | 197 | 70 | 199 | 72 | 201 | 74 | 203 | 76 | 205 | 78 | 207 |
| 80 | 209 | 82 | 211 | 84 | 213 | 86 | 215 | 88 | 217 | 90 | 219 | 92 | 221 | 94 | 223 |
| 96 | 225 | 98 | 227 | 100 | 229 | 102 | 231 | 104 | 233 | 106 | 235 | 108 | 237 | 110 | 239 |
| 112 | 241 | 114 | 243 | 116 | 245 | 118 | 247 | 120 | 249 | 122 | 251 | 124 | 253 | 126 | 255 |
| 128 | 1 | 130 | 3 | 132 | 5 | 134 | 7 | 136 | 9 | 138 | 11 | 140 | 13 | 142 | 15 |
| 144 | 17 | 146 | 19 | 148 | 21 | 150 | 23 | 152 | 25 | 154 | 27 | 156 | 29 | 158 | 31 |
| 160 | 33 | 162 | 35 | 164 | 37 | 166 | 39 | 168 | 41 | 170 | 43 | 172 | 45 | 174 | 47 |
| 176 | 49 | 178 | 51 | 180 | 53 | 182 | 55 | 184 | 57 | 186 | 59 | 188 | 61 | 190 | 63 |

Fig. 33

IMAGE DISPLAY DEVICE, IMAGE DISPLAY SYSTEM, AND INSPECTION METHOD

CROSS REFERENCE TO RELATED APPLICATION

This application is a Bypass Continuation of PCT/JP2019/044236 filed on Nov. 12, 2019, which claims priority based on Japanese Patent Application No. 2019-016110, Japanese Patent Application No. 2019-016111, and Japanese Patent Application No. 2019-016112 filed on Jan. 31, 2019, the disclosure of which is hereby incorporated by reference thereto in its entirety.

BACKGROUND

The present invention relates to an image display device, an image display system, and an inspection method.

For example, in an image display device for displaying an image for medical use, it is important to determine whether a gradation level of an image is appropriately displayed. In association with this, Japanese Unexamined Patent Application Publication No. 2001-34255 discloses a technique for displaying a predetermined contrast pattern in such a way that a user can easily determine a degree of deterioration of luminance in an image display device.

However, a reason why a gradation level is not appropriately displayed is not limited to deterioration of luminance in an image display device. In a case where an input/output characteristic of any constituent element present on a signal transmission path from a generation source of an image signal to an image display unit has non-linearity, an image signal of a gradation level value deviated from an original gradation level value is input to the image display unit due to the non-linearity. In a case where an amount of the deviation is small, it is difficult to recognize presence of non-linearity of an input/output characteristic in a signal transmission path only by viewing a displayed image.

SUMMARY

In the technique disclosed in Japanese Unexamined Patent Application Publication No. 2001-34255, although a degree of deterioration of luminance in an image display device can be easily detected, presence or absence of non-linearity of an input/output characteristic in a signal transmission path cannot be easily checked. Therefore, there is a need for a technique capable of easily checking presence or absence of non-linearity of an input/output characteristic in a signal transmission path.

An image display device according to the present embodiment includes: an image signal reception unit configured to receive an image signal of a pattern image in which N partial images (where N is an integer of 2 or more) having a different gradation level value are regularly arranged; a conversion unit configured to convert a part of gradation level values included in the image signal into a gradation level value in accordance with a predetermined conversion rule; and a display unit configured to display by using an image signal that undergoes conversion by the conversion unit, wherein a gradation level value of an n-th partial image (where n is an integer being not less than 1 and not more than N) among the N partial images is an n-th gradation level value of sequential N-stage gradation levels, and the conversion unit converts a gradation level value corresponding to a term of a predetermined arithmetic progression in accordance with the predetermined conversion rule.

Further, an inspection method according to the present embodiment includes: receiving an image signal of a pattern image in which N partial images (where N is an integer of 2 or more) having a different gradation level value are regularly arranged; converting a part of gradation level values included in the image signal into a gradation level value in accordance with a predetermined conversion rule; and displaying by using an image signal that undergoes the conversion, wherein a gradation level value of an n-th partial image (where n is an integer being not less than 1 and not more than N) among the N partial images is an n-th gradation level value of sequential N-stage gradation levels, and, in the conversion, a gradation level value corresponding to a term of a predetermined arithmetic progression is converted in accordance with the predetermined conversion rule.

Further, an image display device according to the present embodiment includes: an image signal reception unit configured to receive an image signal of a pattern image in which N partial images (where N is an integer of 2 or more) having a different gradation level value are regularly arranged; a conversion unit configured to convert all gradation level values included in the image signal in accordance with a conversion rule selected depending on which term of an arithmetic progression among M types of different arithmetic progressions (where M is an integer of 2 or more) the gradation level value to corresponds to, a common difference of the arithmetic progression being M; and a display unit configured to display by using an image signal that undergoes conversion by the conversion unit, wherein a gradation level value of an n-th partial image (where n is an integer being not less than 1 and not more than N) among the N partial images is an n-th gradation level value of sequential N-stage gradation levels.

Further, an inspection method according to the present embodiment includes: receiving an image signal of a pattern image in which N partial images (where N is an integer of 2 or more) having a different gradation level value are regularly arranged; converting all gradation level values included in the image signal in accordance with a conversion rule selected depending on which term of an arithmetic progression among M types of different arithmetic progressions (where M is an integer of 2 or more) the gradation level value to corresponds to, a common difference of the arithmetic progression being M; and displaying by using an image signal that undergoes the conversion, wherein a gradation level value of an n-th partial image (where n is an integer being not less than 1 and not more than N) among the N partial images is an n-th gradation level value of sequential N-stage gradation levels.

Further, an image display device according to the present embodiment includes: an image signal reception unit configured to successively receive an image signal of N images (where N is an integer of 2 or more) having a different gradation level value; a conversion unit configured to convert a gradation level value included in the image signal in accordance with a predetermined conversion rule; and a display unit configured to display by using an image signal that undergoes conversion by the conversion unit, wherein a gradation level value of an n-th image to be input (where n is an integer being not less than 1 and not more than N) among the N images is an n-th gradation level value of sequential N-stage gradation levels.

Further, an image display system according to the present embodiment includes: the image display device; a sensor configured to measure luminance of an image displayed on the display unit; and a determination unit configured to determine whether luminance measured by the sensor repeats an increase and a decrease.

Further, an inspection method according to the present embodiment includes: successively receiving an image signal of N images (where N is an integer of 2 or more) having a different gradation level value; converting a gradation level value included in the image signal in accordance with a predetermined conversion rule; and displaying by using an image signal that undergoes the conversion, wherein a gradation level value of an n-th image (where n is an integer being not less than 1 and not more than N) to be input among the N images is an n-th gradation level value of sequential N-stage gradation levels.

BRIEF DESCRIPTION OF THE DRAWINGS

FIG. 2 is a schematic diagram illustrating one example of a gradation level value and arrangement of each partial image in a pattern image constituted of 256 types of partial images.

FIG. 4 is a table illustrating one example of an inspection conversion rule.

FIG. 5 is a schematic diagram illustrating a conversion result when the conversion rule illustrated in FIG. 4 is applied to the pattern image illustrated in FIG. 2 in a case where non-linearity is not present in a signal transmission path.

FIG. 7 is a schematic diagram illustrating a conversion result when the conversion rule illustrated in FIG. 4 is applied to the pattern image illustrated in FIG. 2 in a case where a change in gradation level value occurs due to non-linearity in a signal transmission path.

FIG. 9 is a schematic diagram illustrating another example of a gradation level value and arrangement of each partial image in a pattern image constituted of 256 types of partial images.

FIG. 10 is a schematic diagram illustrating a conversion result when the conversion rule illustrated in FIG. 4 is applied to the pattern image illustrated in FIG. 9 in a case where non-linearity is not present in a signal transmission path.

FIG. 12 is a schematic diagram illustrating a conversion result when the conversion rule illustrated in FIG. 4 is applied to the pattern image illustrated in FIG. 9 in a case where a change in gradation level value occurs due to non-linearity in a signal transmission path.

FIG. 14 is a schematic diagram illustrating yet another example of a gradation level value and arrangement of each partial image in a pattern image constituted of 256 types of partial images.

FIG. 15 is a schematic diagram illustrating a conversion result when the conversion rule illustrated in FIG. 4 is applied to the pattern image illustrated in FIG. 14 in a case where non-linearity is not present in a signal transmission path.

FIG. 17 is a schematic diagram illustrating a conversion result when the conversion rule illustrated in FIG. 4 is applied to the pattern image illustrated in FIG. 14 in a case where a change in gradation level value occurs due to non-linearity in a signal transmission path.

FIG. 24 is a table illustrating one example of a conversion rule in which a gradation level value is shifted by a predetermined level value.

FIG. 25 is a schematic diagram illustrating a conversion result when the conversion rule illustrated in FIG. 24 is applied to the pattern image illustrated in FIG. 2 in a case where non-linearity is not present in a signal transmission path.

FIG. 27 is a table illustrating one example of a conversion rule for uniformly converting a gradation level value to be converted being less than a predetermined threshold value into a predetermined first conversion level value, and uniformly converting a gradation level value to be converted being not less than the threshold value into a predetermined second gradation level value.

FIG. 28 is a schematic diagram illustrating a conversion result when the conversion rule illustrated in FIG. 27 is applied to the pattern image illustrated in FIG. 2 in a case where non-linearity is not present in a signal transmission path.

FIG. 30 is a table illustrating one example of a conversion rule according to a second embodiment.

FIG. 32 is a table illustrating one example of a conversion rule in which a gradation level value is shifted by a predetermined level value.

FIG. 33 is a schematic diagram illustrating a pattern image when the conversion rule illustrated in FIG. 32 is applied to the pattern image illustrated in FIG. 2 in a case where non-linearity is not present in a signal transmission path.

DETAILED DESCRIPTION

Figure 1:
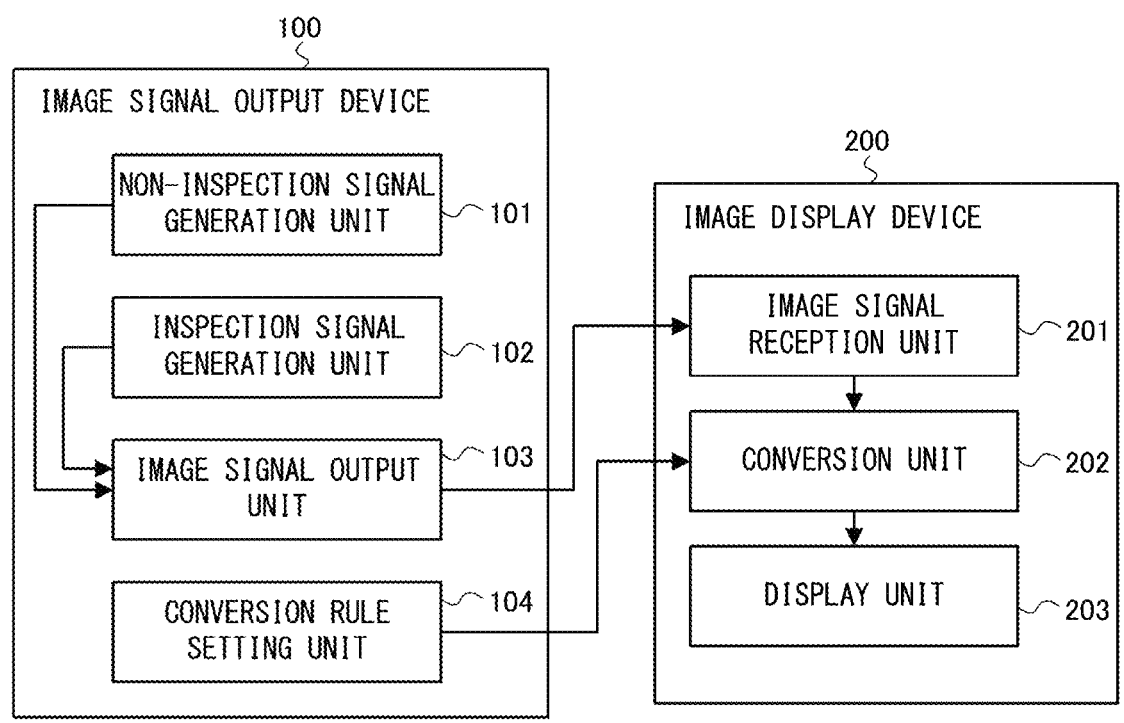
FIG. 1 is a block diagram illustrating one example of a configuration of an image display system according to a first embodiment.

Before embodiments are described, first, matters investigated by the inventors are described.

In a case where an image signal output from an image signal output device such as a personal computer is displayed on an image display device, the image signal is input to a display unit of the image display device, for example, via various elements. These elements are, for example, a driver of a video card of an image signal output device, an output circuit of a video card, a video cable for connecting an image signal output device to an image display device, a receiver circuit of an image display device, a lookup table (hereinafter, referred to as a LUT) of an image display device, and the like. Specifically, processing by these elements is applied to an image signal to be input to a display unit of an image display device. In order to appropriately display a gradation level of an image on a display unit, an input/output characteristic in gradation processing by these elements is desired to have linearity. Specifically, in a case where non-linearity is present in gradation processing by either of the elements, a gradation level of an image cannot be appropriately displayed on a display unit.

However, even when an image having a gradation deviated from a gradation level value that should be inherently displayed is displayed due to non-linearity at a time of displaying on a display unit, generally, it is difficult for a person to recognize an occurrence of such a phenomenon only by viewing a display, because an amount of the deviation is small. This is described by a specific example. Herein, it is assumed that an input/output characteristic of a LUT has linearity. At this occasion, in a case where certain processing of making a gradation characteristic nonlinear is performed with respect to an image signal in which a gradation level value is 50, for example, by an element other than a LUT, an image signal in which a gradation level value is changed to, for example, 49 or 51 is input to a display unit. However, it is difficult to recognize such a change only by viewing a display image.

It is often the case that a general-purpose digital signal transmission equipment product such as a video card imparts non-linearity to an input/output characteristic of a gradation level. In a case where a manufacturer manufacturing the product recognizes a non-linear characteristic of the product by inspecting the product, and clearly mentions the characteristic as specifications of the product, another manufacturer and an end-user who utilize the product can easily recognize presence of non-linearity. However, such clear mentioning is seldom performed. In view of the above, another manufacturer, an end-user, or the like who utilizes the product is required to check presence or absence of non-linearity by themselves. In a case where non-linearity is found, an improvement request such as modification of the product may be needed to be issued to the manufacturer manufacturing the product.

However, as described above, it is difficult to visually determine presence or absence of non-linearity, and only an available method for detecting that linearity of an input/output characteristic in a signal transmission path is guaranteed is individually inspecting a characteristic of each element. Therefore, there is a need for achievement of a technique for easily detecting presence or absence of non-linearity on a signal transmission path of an image signal.

In view of the above, in the following, a technique capable of easily checking presence or absence of non-linearity of an input/output characteristic in a signal transmission path is specifically described.

First Embodiment

In the following, an embodiment according to the present invention is described with reference to the drawings.

FIG. 1 is a block diagram illustrating one example of a configuration of an image display system 10 according to a first embodiment. As illustrated in FIG. 1, the image display system 10 includes an image signal output device 100 and an image display device 200. The image signal output device 100 and the image display device 200 are communicably connected to each other wiredly or wirelessly.

The image signal output device 100 is a terminal device for outputting an image signal to the image display device 200. For example, the image signal output device 100 is a personal computer, a tablet terminal, or a smartphone, but is not limited to these.

The image display device 200 is a device for displaying, on a display unit 203, an image associated with an image signal output from the image signal output device 100. The display unit 203 is, for example, a display such as a liquid crystal monitor and an organic electro-luminescence (EL) monitor, but may be a projector. The image display device 200 may have any configuration, as far as it is possible to display an image. For example, the image display device 200 may be configured as a head-mounted display or a head-up display.

The image signal output device 100 includes a non-inspection signal generation unit 101, an inspection signal generation unit 102, an image signal output unit 103, and a conversion rule setting unit 104.

The non-inspection signal generation unit 101 generates an image for displaying on the image display device 200 at a time of non-inspection, specifically, an image signal of an image for displaying on the image display device 200 at a time of normal operation of the image display system 10. The image is, for example, a medical image acquired by capturing an affected area of a patient in a case where the image display system 10 is utilized as a medical system, but is not limited thereto.

The non-inspection signal generation unit 101 is, for example, software such as image display software. In this case, the non-inspection signal generation unit 101 is achieved by causing a processor included in the image signal output device 100 to execute a program including one or more commands stored in a memory and the like.

The inspection signal generation unit 102 generates an image signal of an image for displaying on the image display device 200 at a time of inspection. Specifically, the inspection signal generation unit 102 generates an image signal of an image for inspecting presence or absence of non-linearity of an input/output characteristic in a signal transmission path.

In the present embodiment, the inspection signal generation unit 102 generates an image signal of a pattern image being an image in which N partial images (where N is an integer or 2 or more) having a different gradation level value are regularly arranged. Herein, a gradation level of the n-th partial image (where n is an integer being not less than 1 and not more than N) among N partial images is the n-th gradation level of sequential N-stage gradation levels.

The sequential N-stage gradation levels are, for example, a series of gradation levels in a range from a lower limit to an upper limit of gradation level values displayable on the image display device 200. For example, in a case where the lower limit is 0, and the upper limit is 255, a pattern image is a pattern image in which 256 types of partial images are regularly arranged. Note that, in the following description, as one example, it is assumed that a pattern image includes 256 types of partial images in which a gradation level value is from 0 to 255. However, a range of gradation level values of partial images included in a pattern image may not coincide with a range from a lower limit to an upper limit of gradation level values displayable on the image display device 200. Specifically, for example, a range of gradation level values of partial images included in a pattern image may be a predetermined range (e.g., 0 to 192, 64 to 224, or the like) included in a range of gradation level values displayable on the image display device 200. Further, a lower limit value of gradation level values may not be 0, and an upper limit value thereof may not be 255.

It is assumed that a lower limit of gradation level values of an image for displaying on the image display device 200 at a time of inspection is referred to as a lower limit inspection gradation level value, and an upper limit thereof is referred to as an upper limit inspection gradation level value. A pattern image includes N partial images from a partial image having a lower limit inspection gradation level value to a partial image having an upper limit inspection gradation level value.

FIG. 2 is a schematic diagram illustrating one example of a gradation level value and arrangement of each partial image in a pattern image constituted of 256 types of partial images. In the example illustrated in FIG. 2, partial images from a partial image having a lower limit inspection gradation level value to a partial image having an upper limit inspection gradation level value are arranged in an order of gradation levels in accordance with the following rule.

Specifically, in the example illustrated in FIG. 2, arranging partial images from one end (specifically, a left end) toward the other end (specifically, a right end) in a horizontal direction every predetermined number of partial images (specifically, every sixteen partial images) is repeated in a vertical direction. Note that, in the present embodiment, a pattern image of a square shape is described as an example. Alternatively, the pattern image may have another shape.

Figure 3:
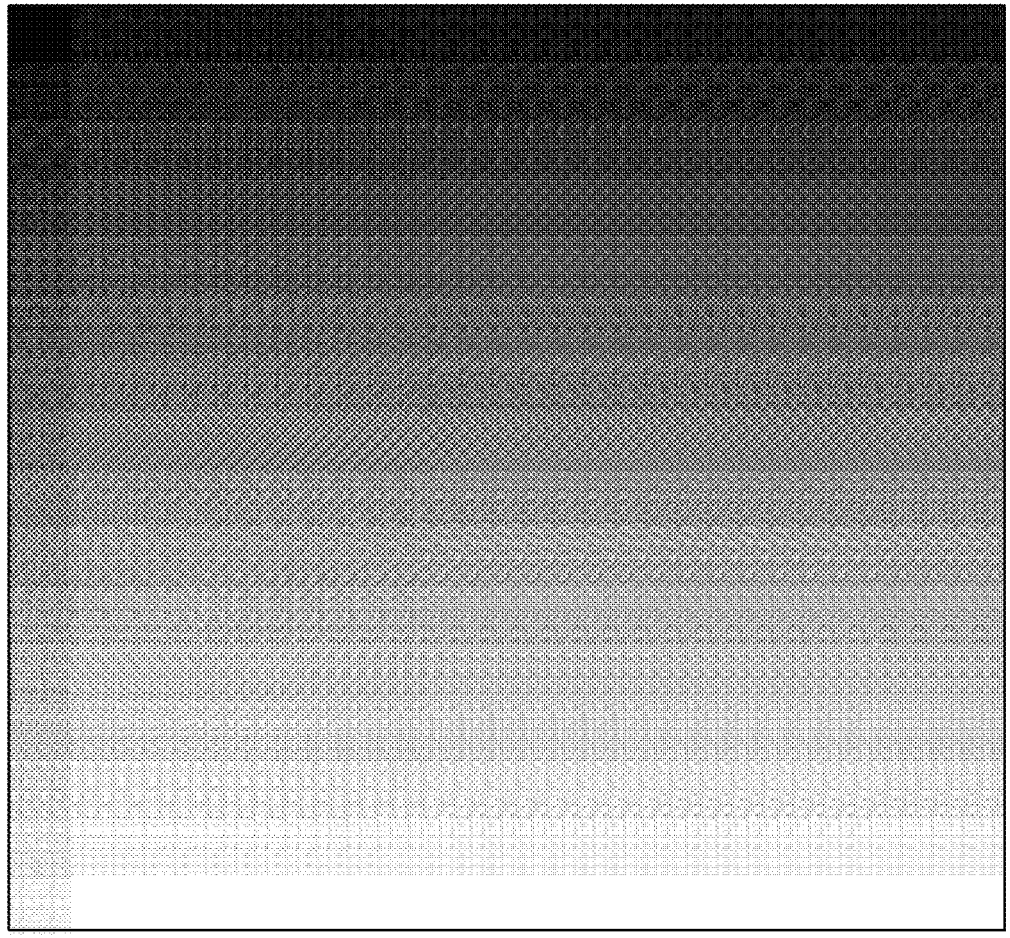
FIG. 3 is a schematic diagram illustrating a pattern image constituted of arrangement of the partial images illustrated in FIG. 2.

FIG. 3 is a schematic diagram illustrating a pattern image constituted of arrangement of the partial images illustrated in FIG. 2. In the example illustrated in FIG. 3, a gradation image is constituted of N types of partial images from a partial image in which a gradation level value is 0, specifically, a partial image represented by black to a partial image in which a gradation level value is 255, specifically, a partial image represented by white.

Note that, as will be described later, a pattern image may be an image in which N partial images having a different gradation level value are regularly arranged, and a specific image configuration is not limited to the configuration illustrated in FIGS. 2 and 3.

The inspection signal generation unit 102 is, for example, achieved by software. In this case, the inspection signal generation unit 102 is achieved by causing a processor included in the image signal output device 100 to execute a program including one or more commands stored in a memory and the like.

Note that, the inspection signal generation unit 102 may generate the above-described image signal by any processing. For example, the inspection signal generation unit 102 may output an image signal by decoding a pattern image file that is compressed in a predetermined format and generated in advance, or may generate an image signal by computing a pixel value of each pixel according to a predetermined algorithm for generating a pattern image. Further, the inspection signal generation unit 102 may generate an image signal equivalent to a pattern image by analyzing an image acquired by capturing the pattern image printed in advance by a camera.

The image signal output unit 103 is an output circuit for outputting, to the image display device 200, an image signal generated by the non-inspection signal generation unit 101 and an image signal generated by the inspection signal generation unit 102.

The conversion rule setting unit 104 sets, in a conversion unit 202, a conversion rule of a gradation level value. The conversion rule setting unit 104 sets, in the conversion unit 202, a conversion rule for performing predetermined gamma correction at a time of normal operation of the image display system 10. In contrast, the conversion rule setting unit 104 sets, in the conversion unit 202, an inspection conversion rule at a time of inspecting presence or absence of non-linearity of an input/output characteristic in a signal transmission path. Details of the inspection conversion rule are described later.

The conversion rule setting unit 104 is, for example, achieved by software. In this case, the conversion rule setting unit 104 is achieved by causing a processor included in the image signal output device 100 to execute a program including one or more commands stored in a memory and the like. Note that, the conversion rule setting unit 104 may be achieved by another configuration. For example, the conversion rule setting unit 104 may be a circuit for outputting a setting value of a conversion rule that is generated in advance and stored in a memory, specifically, a setting value of an output value for each input value in the conversion unit 202, or may be a logic circuit designed in such a way as to generate a setting value of a conversion rule, specifically, a digital signal generator. Note that, in the example illustrated in FIG. 1, the conversion rule setting unit 104 is provided in the image signal output device 100. Alternatively, the conversion rule setting unit 104 may be provided in the image display device 200. This also applies to another embodiment to be described later.

Note that, FIG. 1 illustrates the non-inspection signal generation unit 101 and the inspection signal generation unit 102 separately. Alternatively, the image signal output device 100 may include one constituent element having these two functions.

An image signal generated by the non-inspection signal generation unit 101, and an image signal generated by the inspection signal generation unit 102 are input to the conversion unit 202 of the image display device 200 through a common signal transmission path. The signal transmission path includes, for example, a video card (not illustrated) of the image signal output device, a video cable (not illustrated) for connecting the image signal output device 100 to the image display device 200, and the like, in addition to the image signal output unit 103 of the image signal output device 100, and an image signal reception unit 201 of the image display device 200. Note that, not only these elements but also any element for performing predetermined processing with respect to an image signal may be included on a signal transmission path.

The image display device 200 includes the image signal reception unit 201, the conversion unit 202, and the display unit 203.

The image signal reception unit 201 is a reception circuit for receiving an image signal output from the image signal output device 100. An image signal received by the image signal reception unit 201 is input to the conversion unit 202. Note that, an image signal received by the image signal reception unit 201 may be input to the conversion unit 202 after having undergone predetermined signal processing. Specifically, unillustrated another element may be present on a signal transmission path from the image signal reception unit 201 to the conversion unit 202.

The display unit 203 displays by using an image signal which has undergone conversion by the conversion unit 202.

The conversion unit 202 converts a gradation level value included in an image signal received by the image signal reception unit 201 in accordance with a predetermined conversion rule. In particular, the conversion unit 202 performs conversion in accordance with an inspection conversion rule at a time of inspecting presence or absence of non-linearity of an input/output characteristic in a signal transmission path.

In the present embodiment, at a time of inspection, the conversion unit 202 performs conversion of a part of gradation level values included in an image signal received by the image signal reception unit 201. Specifically, the conversion unit 202 performs conversion of a gradation level value, while using, as a target, a part of partial images having various gradation level values and included in a pattern image. Specifically, the conversion unit 202 converts a gradation level value corresponding to a term of a predetermined arithmetic progression in accordance with an inspection conversion rule. For example, in a case where a predetermined arithmetic progression is an arithmetic progression representing an even number, a gradation level value corresponding to a term of the predetermined arithmetic progression is an even-numbered gradation level value. Further, for example, in a case where a predetermined arithmetic progression is an arithmetic progression representing an odd number, a gradation level value corresponding to a term of the predetermined arithmetic progression is an odd-numbered gradation level value. Note that, the predetermined arithmetic progression may be another arithmetic progression.

The conversion unit 202 is, for example, a LUT to be mounted by using a memory. In this case, the conversion unit 202 outputs a gradation level value after conversion, which is held in advance in an address corresponding to an input gradation level value. In this way, the conversion unit 202 is achieved by, for example, a table-type signal computer, but may be achieved by another configuration. For example, the conversion unit 202 may be a logic circuit designed in such a way as to perform value conversion processing in accordance with a conversion rule, specifically, a digital signal converter. The conversion unit 202 is achieved by, for example, a hardware circuit as described above, but may be achieved by software. Specifically, the conversion unit 202 may be achieved by causing a processor included in the image signal output device 100 to execute a program including one or more commands stored in a memory and the like.

FIG. 4 is a table illustrating one example of an inspection conversion rule. The conversion rule according to the example illustrated in FIG. 4 is a conversion rule in which an even-numbered gradation level value is changed to 0. Therefore, in this case, when a gradation level value to be input to the conversion unit 202 is an even number, the conversion unit 202 outputs 0, and when a gradation level value to be input to the conversion unit 202 is an odd number, the conversion unit 202 outputs the input gradation level value. Thus, a partial image having an even-numbered gradation level value at a time when a gradation level value is input to the conversion unit 202 among partial images included in a pattern image is converted into a partial image in which a gradation level value is 0.

Figure 6:
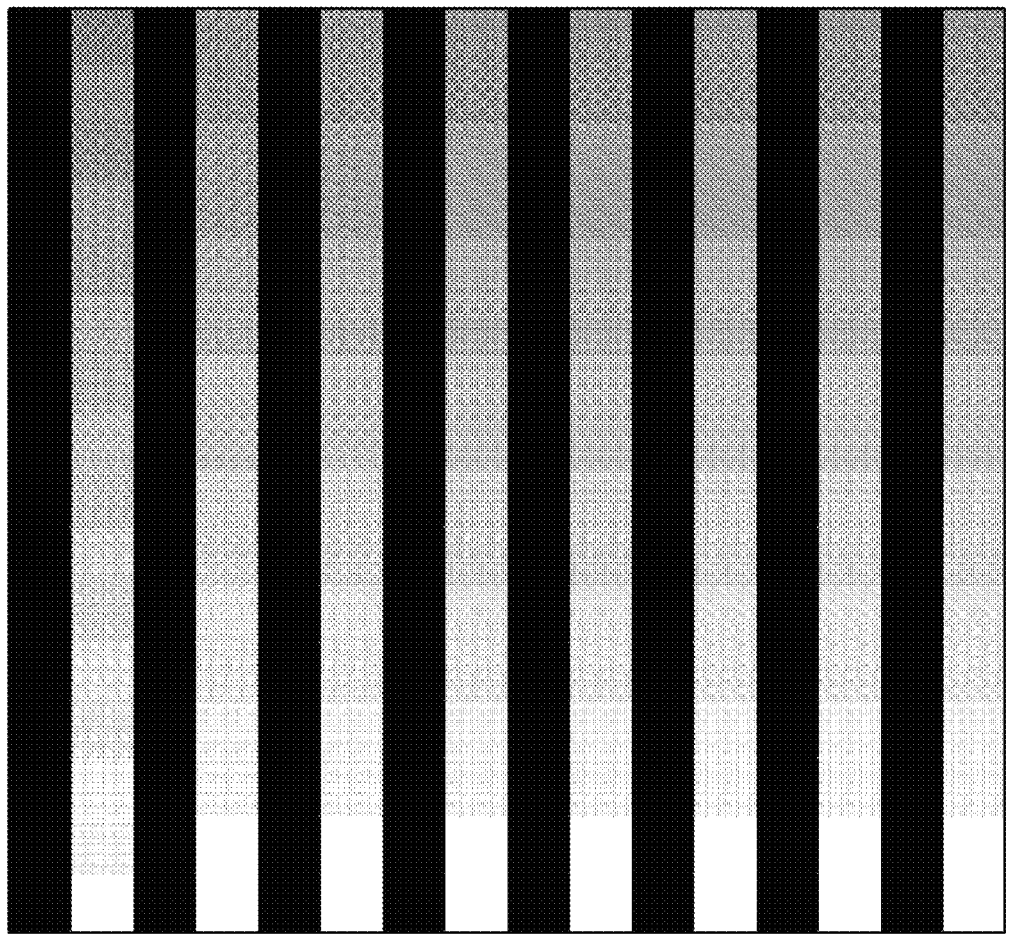
FIG. 6 is a schematic diagram illustrating a pattern image constituted of arrangement of partial images illustrated in FIG. 5.

FIG. 5 is a schematic diagram illustrating a conversion result when the conversion rule illustrated in FIG. 4 is applied to the pattern image illustrated in FIG. 2 in a case where non-linearity is not present in a signal transmission path. Further, FIG. 6 is a schematic diagram illustrating a pattern image constituted of arrangement of partial images illustrated in FIG. 5. In a case where non-linearity is not present in a signal transmission path, as illustrated in FIG. 6, a complete striped pattern is formed by a partial image group in which gradation level values arranged in a vertical direction are 0, and a partial image group having an original gradation level value arranged in a vertical direction.

Herein, in a case where linearity of an input/output characteristic of a gradation level is not secured in a signal transmission path up to the conversion unit 202, as compared with a time of generation by the inspection signal generation unit 102, a change occurs in gradation level value of a pattern image. For example, in a case where brightness or contrast is changed from a default value by setting of a video card and the like, even when a partial image in which a gradation level value is 50 is drawn by software (inspection signal generation unit 102), the partial image is converted into a partial image having another gradation level value such as 49 or 51 because the output is changed by a driver of the video card and the like.

Figure 8:
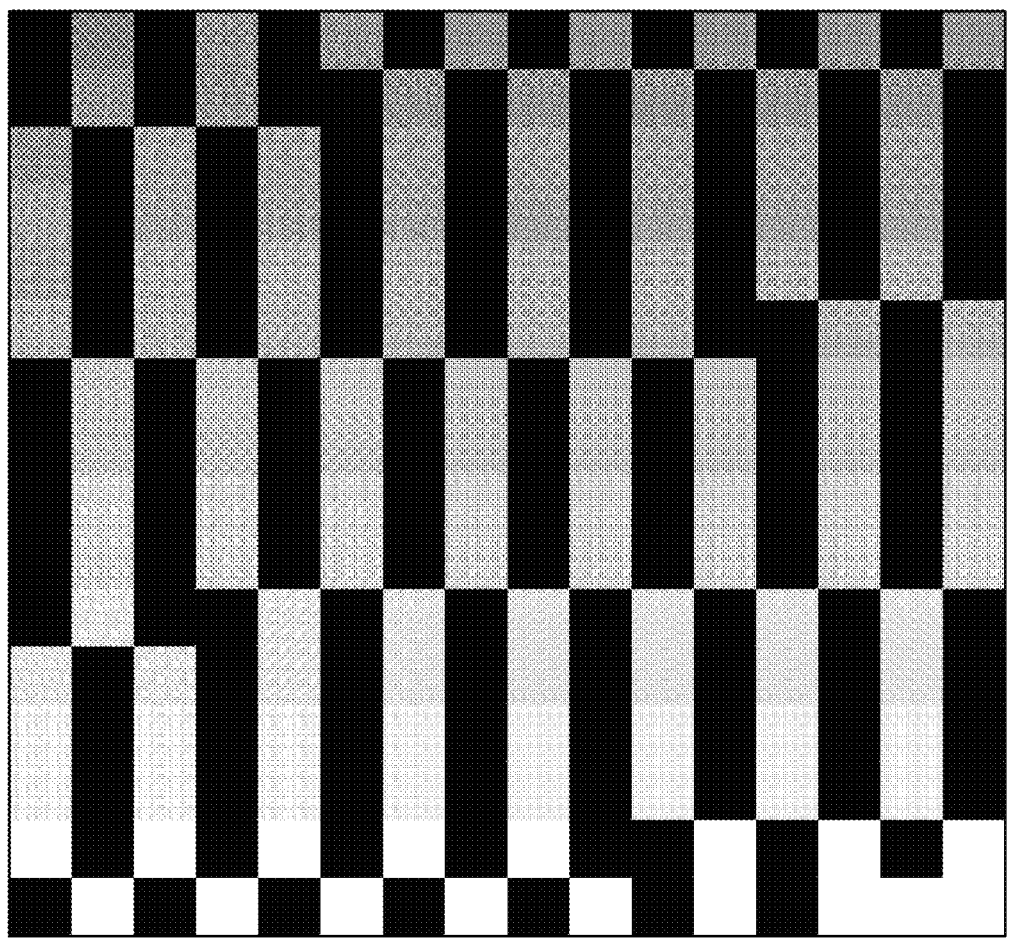
FIG. 8 is a schematic diagram illustrating a pattern image constituted of arrangement of partial images illustrated in FIG. 7.

FIG. 7 is a schematic diagram illustrating a conversion result when the conversion rule illustrated in FIG. 4 is applied to the pattern image illustrated in FIG. 2 in a case where a change in gradation level value occurs due to non-linearity in a signal transmission path. Further, FIG. 8 is a schematic diagram illustrating a pattern image constituted of arrangement of partial images illustrated in FIG. 7. In the example illustrated in FIG. 7, a change in gradation level value as described below occurs due to non-linearity in a signal transmission path. Specifically, a deviation that a gradation level value increases by 1 occurs in a range in which an original gradation level value is not less than 21 and not more than 92, a deviation that a gradation level value increases by 2 occurs in a range in which an original gradation level value is not less than 93 and not more than 164, a deviation that a gradation level value increases by 3 occurs in a range in which an original gradation level value is not less than 165 and not more than 236, and a deviation that a gradation level value increases by 4 occurs in a range in which an original gradation level value is not less than 237. As illustrated in FIG. 7, in a case where non-linearity is included in a signal transmission path, a position, on an image plane, of a partial image in which a gradation level value is set to 0 by conversion of the conversion unit 202 becomes irregular.

Consequently, an irregular pattern as illustrated in FIG. 8 is formed. Specifically, in a case where a change in gradation level value occurs due to non-linearity in a signal transmission path, the pattern illustrated in FIG. 6 collapses. Since a small change of a gradation level value is represented as a change of a pattern, visual recognition is easy. Specifically, a person in charge of inspection can easily determine presence or absence of non-linearity in a signal transmission path only by checking whether the pattern illustrated in FIG. 6 is displayed on the display unit 203, or a pattern different from the pattern illustrated in FIG. 6 is displayed on the display unit 203.

In the foregoing, the image display system 10 has been specifically described. However, the above-described specific description is merely one example. For example, as described above, a pattern image may be an image in which N partial images having a different gradation level value are regularly arranged. Therefore, arrangement of each gradation level value in a pattern image is not limited to the example illustrated in FIGS. 2 and 3. In the example illustrated in FIGS. 2 and 3, partial images are arranged from a left end toward a right end in an order of gradation level values every predetermined number of partial images. Alternatively, partial images may be arranged from a right end toward a left end in an order of gradation level values every predetermined number of partial images.

Further, for example, partial images from a partial image having a lower limit inspection gradation level value to a partial image having an upper limit inspection gradation level value may be arranged in an order of gradation levels in accordance with a rule as illustrated in FIG. 9. Specifically, in the example illustrated in FIG. 9, arranging partial images from one end (specifically, an upper end) toward the other end (specifically, a lower end) in a vertical direction every predetermined number of partial images (specifically, every sixteen partial images) is repeated in a vertical direction. Note that, in the example illustrated in FIG. 9, partial images are arranged from an upper end toward a lower end. Alternatively, partial images may be arranged from a lower end toward an upper end.

Figure 11:
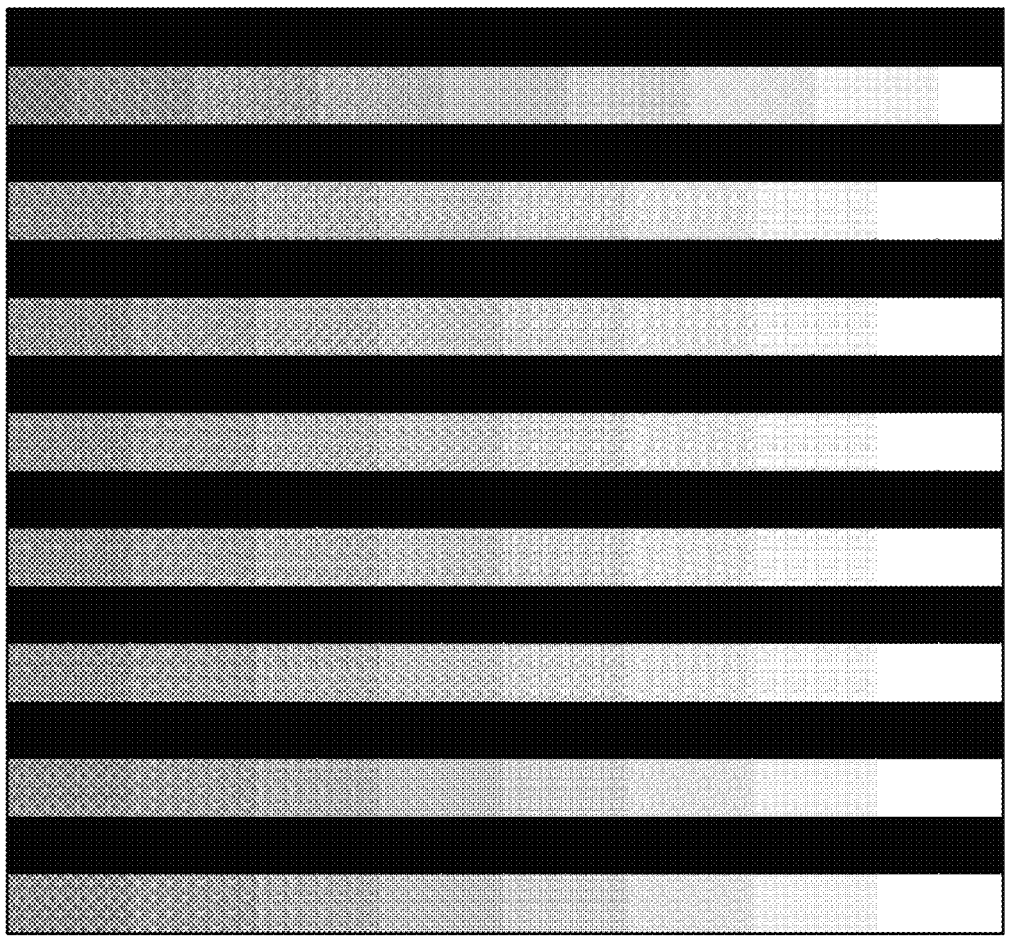
FIG. 11 is a schematic diagram illustrating a pattern image constituted of arrangement of partial images illustrated in FIG. 10.

FIG. 10 is a schematic diagram illustrating a conversion result when the conversion rule illustrated in FIG. 4 is applied to the pattern image illustrated in FIG. 9 in a case where non-linearity is not present in a signal transmission path. Further, FIG. 11 is a schematic diagram illustrating a pattern image constituted of arrangement of partial images illustrated in FIG. 10. In a case where non-linearity is not present in a signal transmission path, as illustrated in FIG. 11, a complete striped pattern is formed by a partial image group in which gradation level values arranged in a horizontal direction are 0, and a partial image group having an original gradation level value arranged in a horizontal direction.

Figure 13:
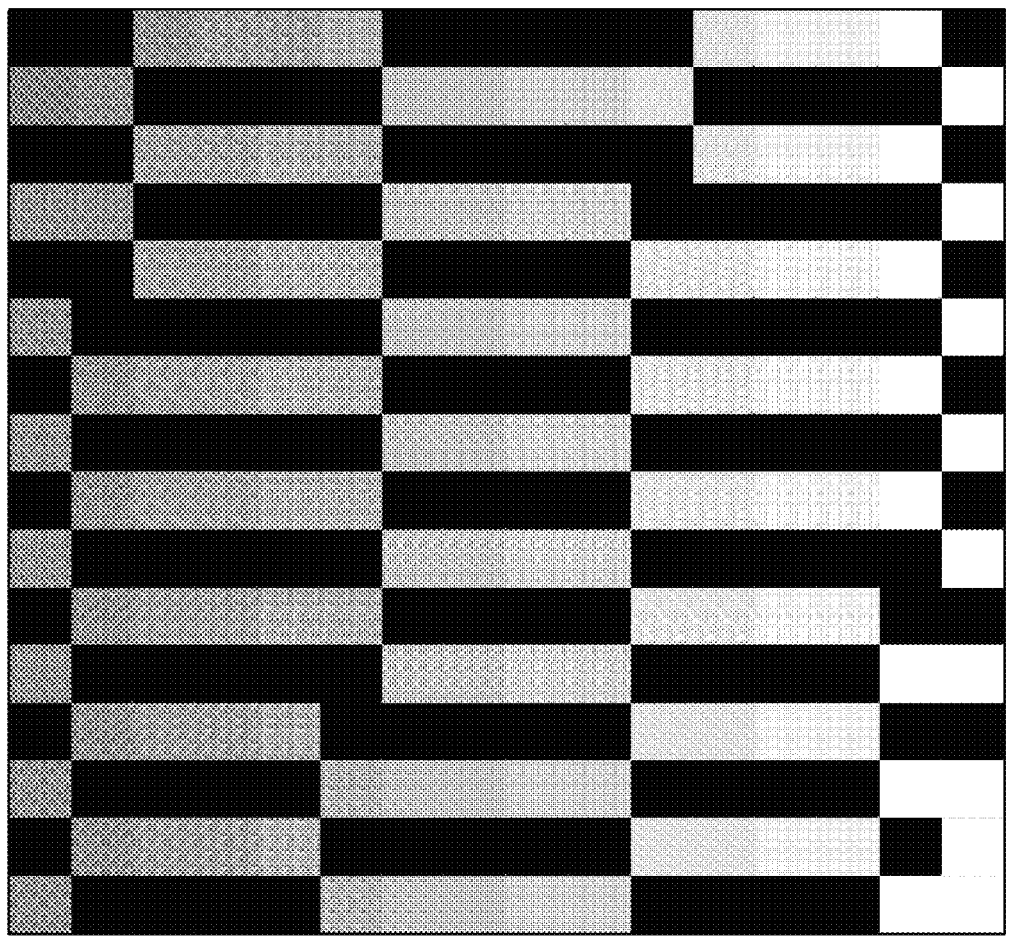
FIG. 13 is a schematic diagram illustrating a pattern image constituted of arrangement of partial images illustrated in FIG. 12.

FIG. 12 is a schematic diagram illustrating a conversion result when the conversion rule illustrated in FIG. 4 is applied to the pattern image illustrated in FIG. 9 in a case where a change in gradation level value occurs due to non-linearity in a signal transmission path. Further, FIG. 13 is a schematic diagram illustrating a pattern image constituted of arrangement of partial images illustrated in FIG. 12. Note that, in the example illustrated in FIGS. 12 and 13, a change in gradation level value similar to the example illustrated in FIG. 7 occurs due to non-linearity in a signal transmission path.

As illustrated in FIG. 13, in a case where non-linearity is included in a signal transmission path, a position, on an image plane, of a partial image in which a gradation level value is set to 0 by conversion of the conversion unit 202 becomes irregular. Consequently, the pattern illustrated in FIG. 11 collapses, and an irregular pattern as illustrated in FIG. 13 is formed.

Further, for example, partial images from a partial image having a lower limit inspection gradation level value to a partial image having an upper limit inspection gradation level value may be arranged in an order of gradation levels in accordance with a rule as illustrated in FIG. 14. Specifically, in the example illustrated in FIG. 14, arranging partial images in an alternate horizontal direction is repeated in a vertical direction. Note that, in the example of FIG. 14, a partial image in which a gradation level value is 0 is arranged at an upper left end, and each partial image is arranged in an order of gradation level values. Alternatively, a partial image in which a gradation level value is 0 may be arranged at any of four corners other than the above, and each partial image may be arranged in an order of gradation level values. Further, arranging partial images in an alternate vertical direction may be repeated in a horizontal direction.

Figure 16:
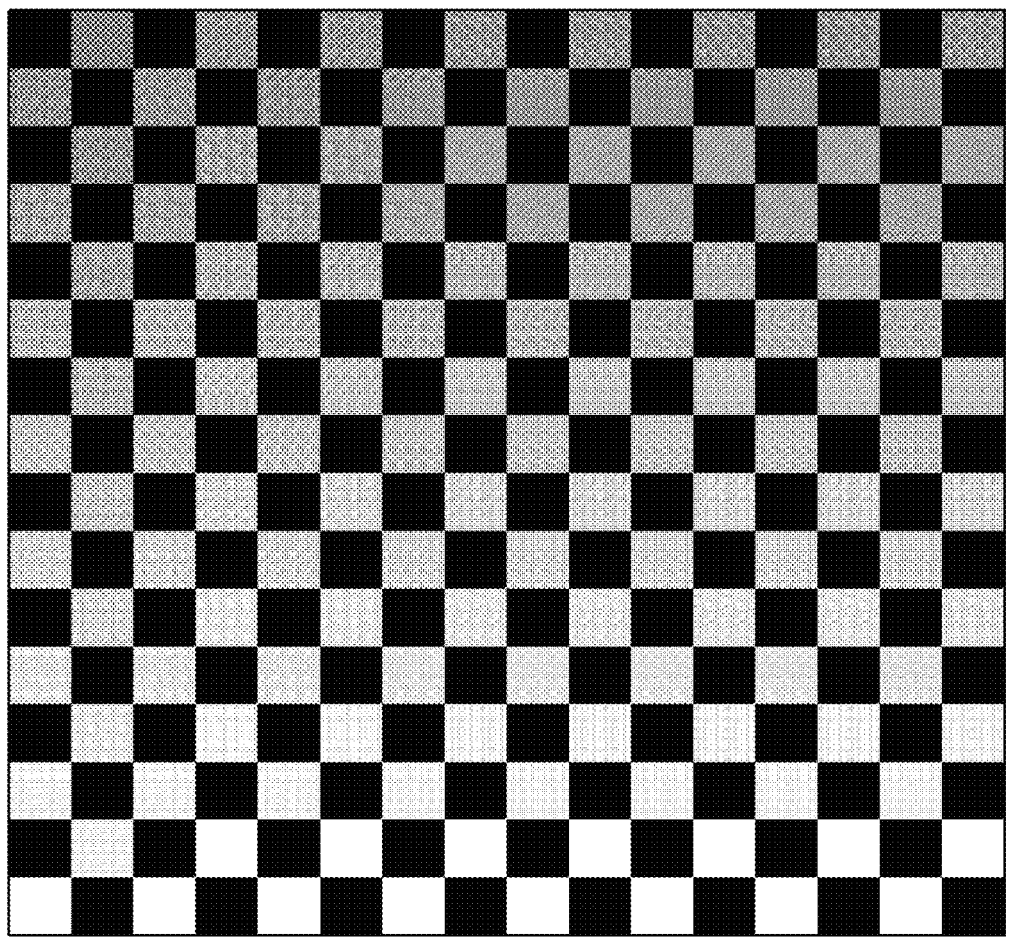
FIG. 16 is a schematic diagram illustrating a pattern image constituted of arrangement of partial images illustrated in FIG. 15.

FIG. 15 is a schematic diagram illustrating a conversion result when the conversion rule illustrated in FIG. 4 is applied to the pattern image illustrated in FIG. 14 in a case where non-linearity is not present in a signal transmission path. Further, FIG. 16 is a schematic diagram illustrating a pattern image constituted of arrangement of partial images illustrated in FIG. 15. In a case where non-linearity is not present in a signal transmission path, as illustrated in FIG. 16, a complete checkered pattern is formed by a partial image group in which a gradation level value is 0, and a partial image group having an original gradation level value. In this way, in a case where the number of partial images arranged in a direction (e.g., a horizontal direction) in which partial images are sequentially arranged is an even number, it is possible to form a checkered pattern by the above-described method. Note that, in a case where the number of partial images arranged in a direction in which partial images are sequentially arranged is an odd number, it is possible to form a checkered pattern by repeating, in a vertical direction, arranging partial images from one end toward the other end in a horizontal direction every odd number of partial images.

Figure 18:
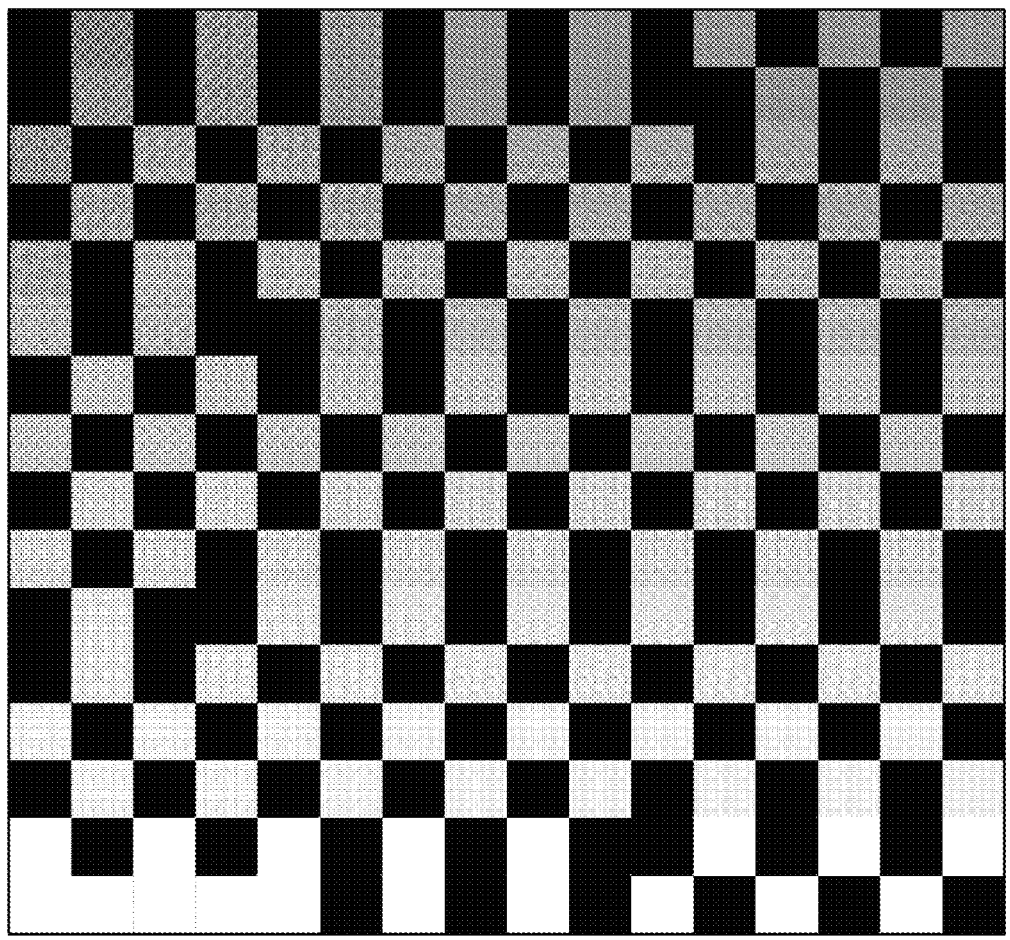
FIG. 18 is a schematic diagram illustrating a pattern image constituted of arrangement of partial images illustrated in FIG. 17.
Figure 19:
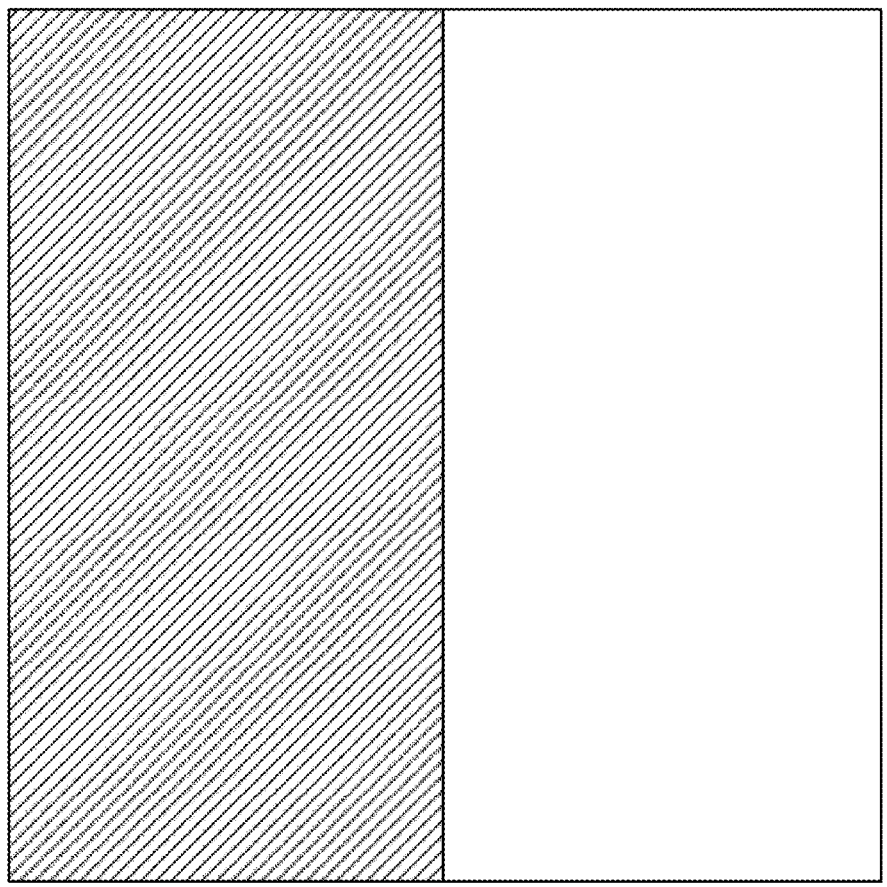
FIG. 19 is a schematic diagram illustrating a geometric pattern formed by two areas being an area of a partial image group in which a gradation level value is set to a predetermined value by conversion of a conversion unit, and an area of a partial image group having an original gradation level value.
Figure 20:
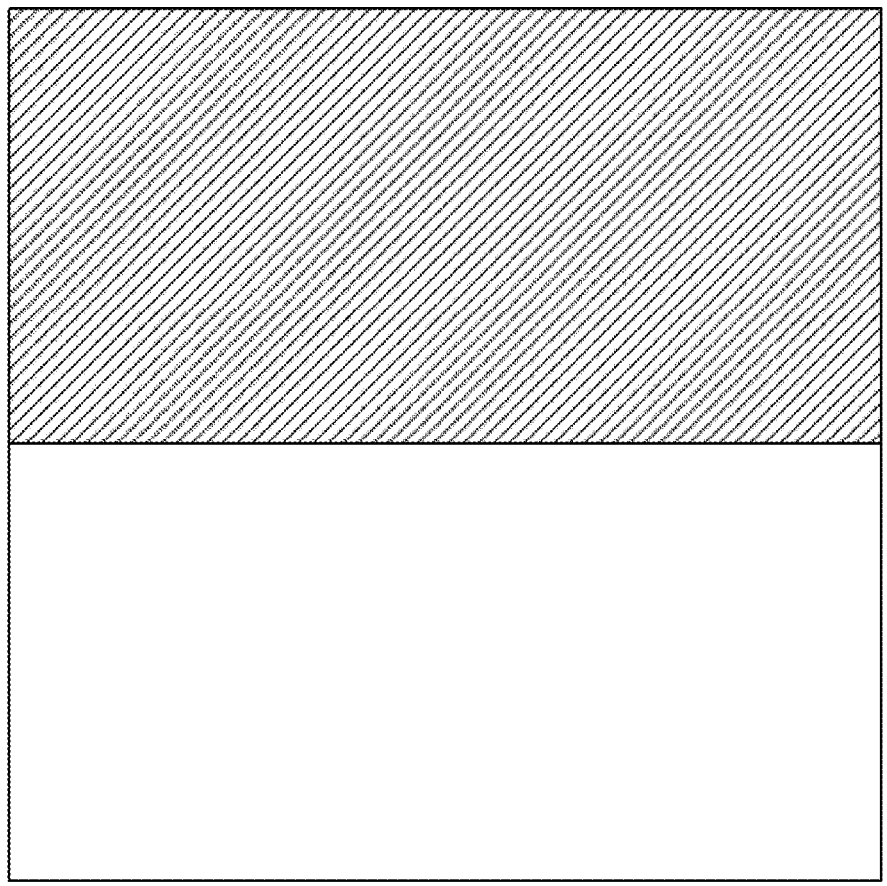
FIG. 20 is a schematic diagram illustrating a geometric pattern formed by two areas being an area of a partial image group in which a gradation level value is set to a predetermined value by conversion of a conversion unit, and an area of a partial image group having an original gradation level value.
Figure 21:
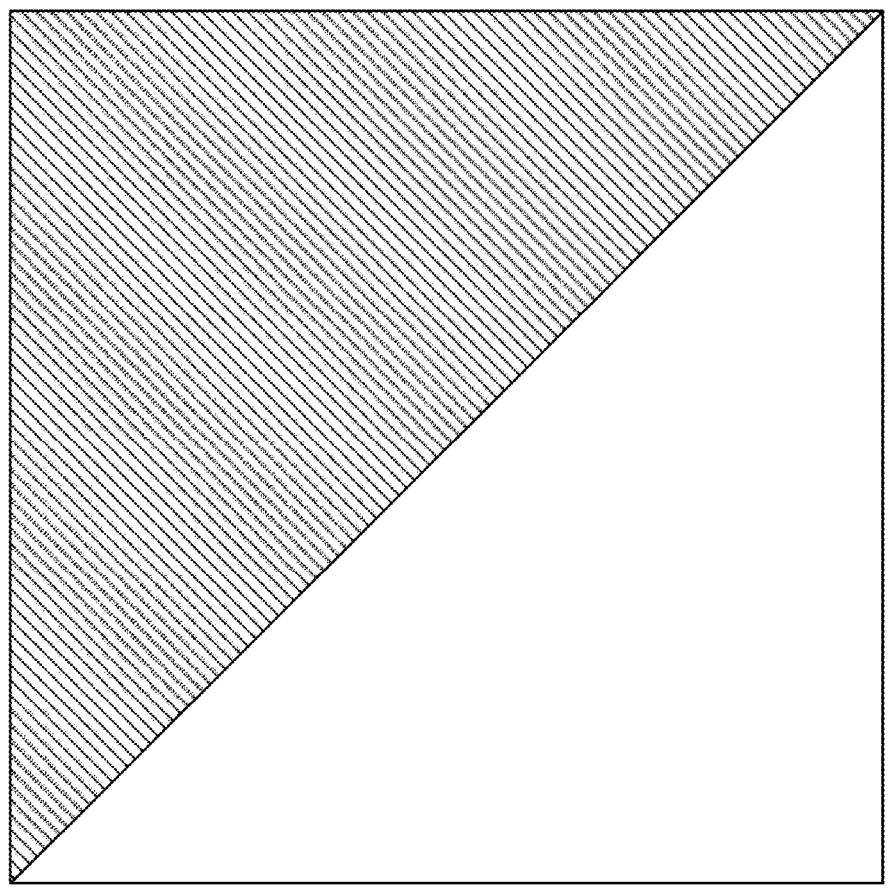
FIG. 21 is a schematic diagram illustrating a geometric pattern formed by two areas being an area of a partial image group in which a gradation level value is set to a predetermined value by conversion of a conversion unit, and an area of a partial image group having an original gradation level value.
Figure 22:
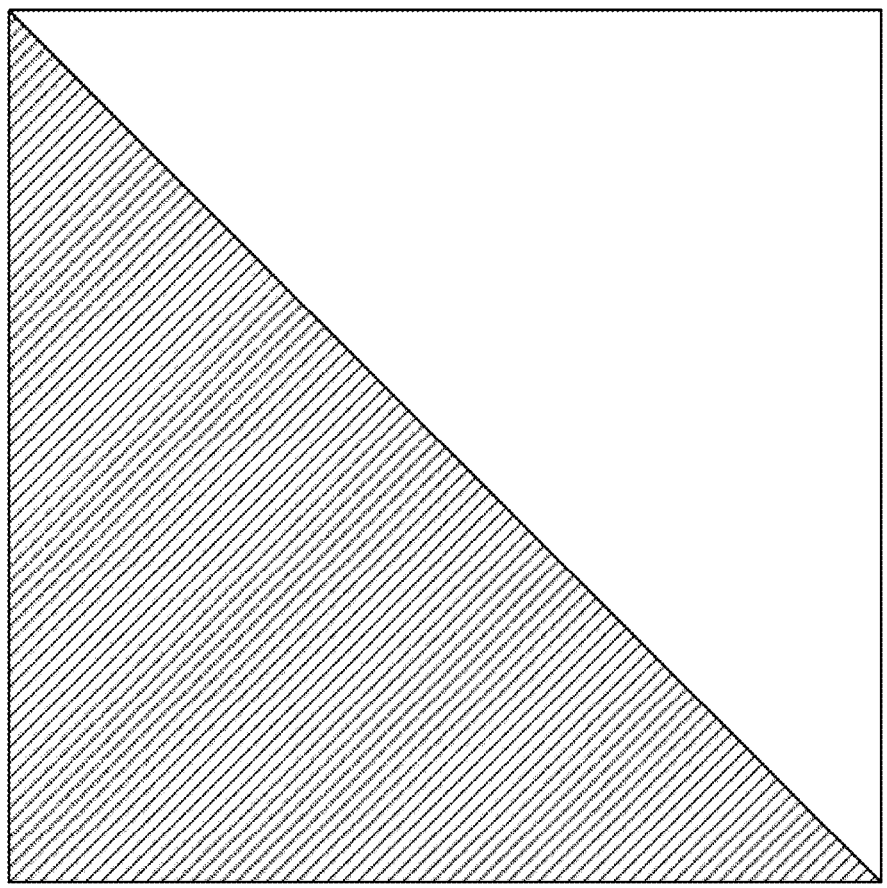
FIG. 22 is a schematic diagram illustrating a geometric pattern formed by two areas being an area of a partial image group in which a gradation level value is set to a predetermined value by conversion of a conversion unit, and an area of a partial image group having an original gradation level value.
Figure 23:
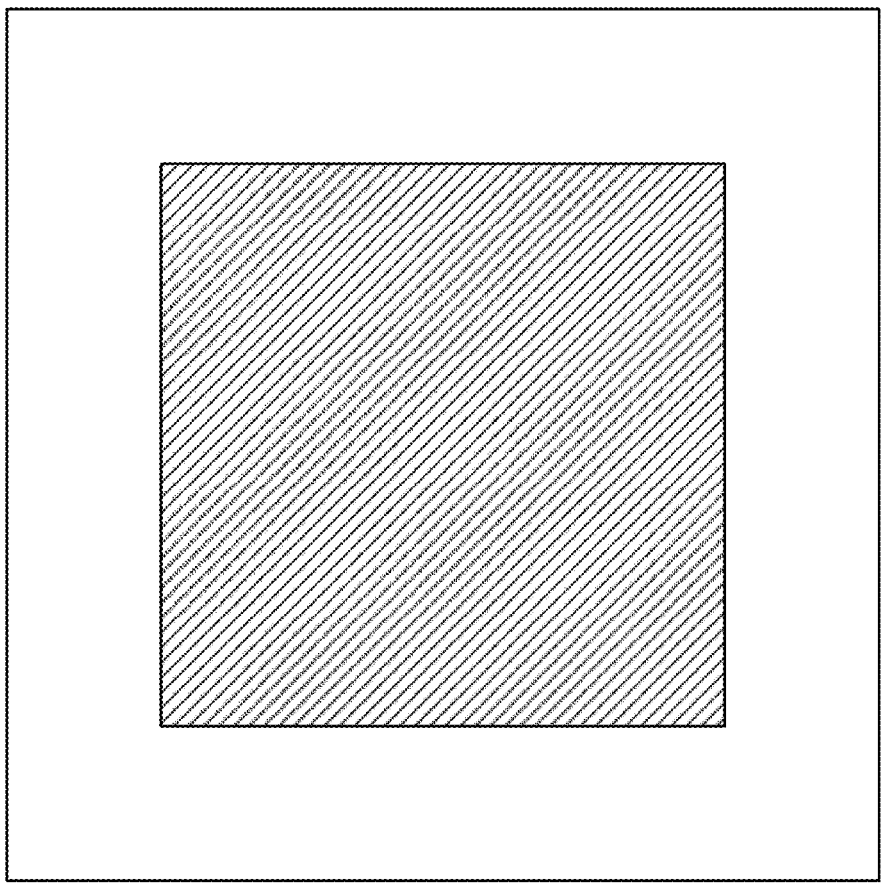
FIG. 23 is a schematic diagram illustrating a geometric pattern formed by two areas being an area of a partial image group in which a gradation level value is set to a predetermined value by conversion of a conversion unit, and an area of a partial image group having an original gradation level value.

FIG. 17 is a schematic diagram illustrating a conversion result when the conversion rule illustrated in FIG. 4 is applied to the pattern image illustrated in FIG. 14 in a case where a change in gradation level value occurs due to non-linearity in a signal transmission path. Further, FIG. 18 is a schematic diagram illustrating a pattern image constituted of arrangement of partial images illustrated in FIG. 17. Note that, in the example illustrated in FIGS. 17 and 18, a change in gradation level value similar to the example illustrated in FIG. 7 occurs due to non-linearity in a signal transmission path.

As illustrated in FIG. 18, in a case where non-linearity is included in a signal transmission path, a position, on an image plane, of a partial image in which a gradation level value is set to 0 by conversion of the conversion unit 202 becomes irregular. Consequently, the pattern illustrated in FIG. 16 collapses, and an irregular pattern as illustrated in FIG. 18 is formed.

In the foregoing description, a striped pattern and a checkered pattern are described as examples of a regular pattern. However, a regular pattern is not limited to these. For example, as illustrated in FIGS. 19 to 23, a regular pattern may be a geometric pattern formed by two areas being an area of a partial image group in which a gradation level value is set to a predetermined value by conversion of the conversion unit 202, and an area of a partial image group having an original gradation level value. Note that, in FIGS. 19 to 23, a hatched area is an area of a partial image group in which a gradation level value is set to 0, and an unhatched area is an area of a partial image group having an original gradation level value. These patterns are acquired by using a pattern image in which a partial image group in which a gradation level value is set to 0 by the conversion unit 202 in a case where a signal transmission path is linear is arranged in a hatched area, and a partial image group other than the above is arranged in an unhatched area.

Also, the conversion rule may be a conversion rule in which a predetermined pattern (e.g., a geometric pattern) is applied to a pattern image in a case where non-linearity is not present in a signal transmission path, and the conversion rule is not limited to the above-described specific example.

For example, in the above-described specific example, the conversion rule is a conversion rule in which an even-numbered gradation level value is changed to 0. Alternatively, the gradation level value to be changed may not be an even-numbered gradation level value, and may be an odd-numbered gradation level value. Further, a gradation level value to be set by changing may not be a minimum value of sequential N-stage gradation levels. A gradation level value to be set by changing may be a maximum value (specifically, for example, 255) of sequential N-stage gradation levels, or may be any predetermined value in a range from a minimum value to a maximum value.

In this way, the conversion rule is, for example, a rule for uniformly converting a gradation level value to be converted into a predetermined gradation level value. However, the conversion rule is not limited to a rule for uniformly converting a gradation level value to be converted into a predetermined gradation level value.

For example, the conversion rule may be a rule for performing conversion in which an input gradation level value is shifted by a predetermined level value. Specifically, the conversion rule may be a conversion rule for performing conversion in which a predetermined level value is added to or subtracted from an input gradation level value. Note that, a computation result is wrapped around in such a way that a gradation level value after conversion does not deviate from a range of gradation level values displayable on the image display device 200.

FIG. 24 is a table illustrating one example of a conversion rule in which a gradation level value is shifted by a predetermined level value. The conversion rule according to the example illustrated in FIG. 24 is a conversion rule in which an even-numbered gradation level value is changed in such a way that 128 is added. However, in a case where a value after addition exceeds 255, 256 is subtracted from an addition result. Specifically, wrap-around computation is performed. In this case, when a gradation level value to be input to the conversion unit 202 is an even number, the conversion unit 202 adds 128 to the input value, and outputs a gradation level value acquired by performing wrap-around computation, and when a gradation level value to be input to the conversion unit 202 is an odd number, the conversion unit 202 outputs the input gradation level value.

Figure 26:
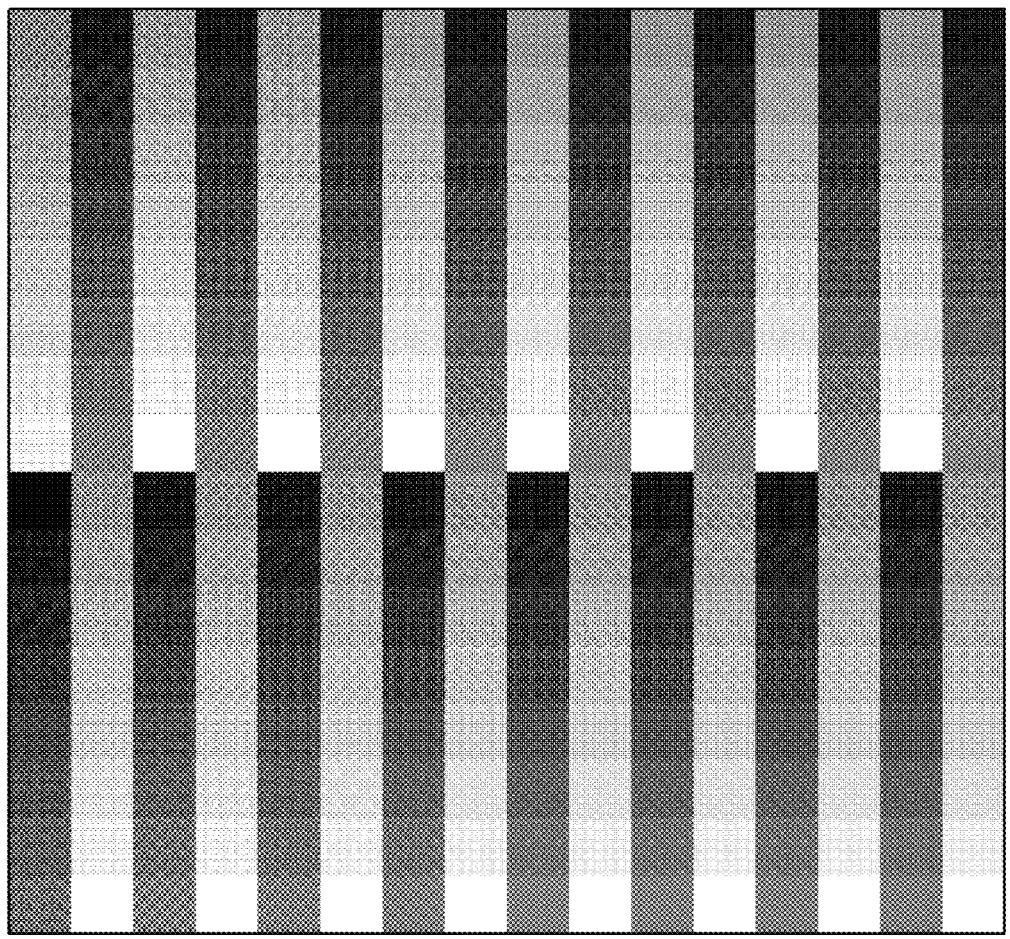
FIG. 26 is a schematic diagram illustrating a pattern image constituted of arrangement of partial images illustrated in FIG. 25.

FIG. 25 is a schematic diagram illustrating a conversion result when the conversion rule illustrated in FIG. 24 is applied to the pattern image illustrated in FIG. 2 in a case where non-linearity is not present in a signal transmission path. Further, FIG. 26 is a schematic diagram illustrating a pattern image constituted of arrangement of partial images illustrated in FIG. 25. In a case where non-linearity is not present in a signal transmission path, a geometric pattern as illustrated in FIG. 26 is formed. Also in such an example, a person in charge of inspection can easily determine presence or absence of non-linearity in a signal transmission path only by checking whether the pattern illustrated in FIG. 26 is displayed on the display unit 203, or a pattern different from the pattern illustrated in FIG. 26 is displayed on the display unit 203.

Note that, in the example illustrated in FIG. 24, a conversion rule in which a predetermined value is added to an even-numbered gradation level value is described. Alternatively, a conversion rule in which a predetermined value is subtracted from an even-numbered gradation level value may be employed. Further alternatively, a conversion rule in which a predetermined value is added to an odd-numbered gradation level value, or a conversion rule in which a predetermined value is subtracted from an odd-numbered gradation level value may be employed. Furthermore alternatively, a conversion rule in which a predetermined value is added to or subtracted from a gradation level value corresponding to a term of another predetermined arithmetic progression other than an even number and an odd number.

Further, a conversion rule as illustrated in FIG. 27 may be employed. The conversion rule illustrated in FIG. 27 is a rule in which a gradation level value to be converted and being less than a predetermined threshold value is uniformly converted into a predetermined first gradation level value, and a gradation level value to be converted and being not less than the threshold value is uniformly converted into a predetermined second gradation level value. Specifically, in the conversion rule illustrated in FIG. 27, a gradation level value to be converted is an even-numbered gradation level value, the predetermined threshold value is 128, the predetermined first gradation level value is 255, and the predetermined second gradation level value is 0. Note that, these are one example, and a gradation level value to be converted may be a gradation level value corresponding to a term of a predetermined arithmetic progression such as an odd number. Further, it is also possible to adopt another value regarding the threshold value, the first gradation level value, and the second gradation level value.

Figure 29:
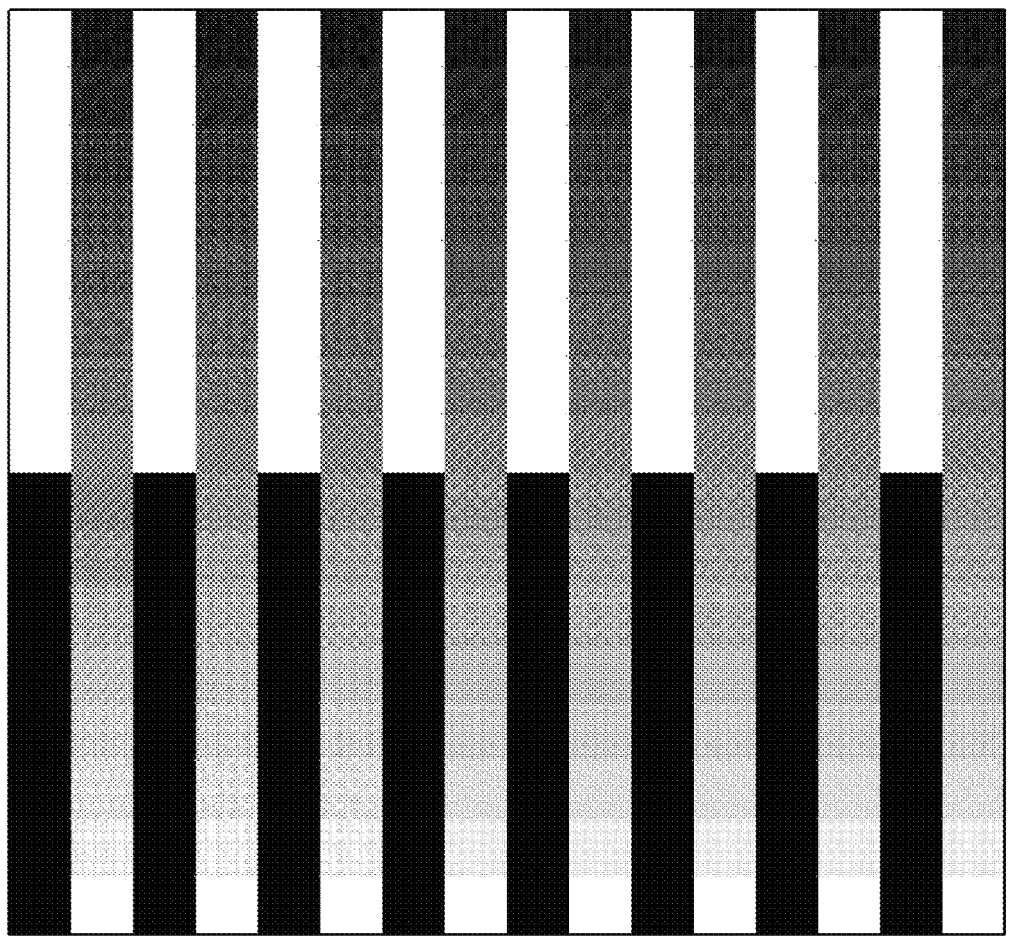
FIG. 29 is a schematic diagram illustrating a pattern image constituted of arrangement of partial images illustrated in FIG. 28.

FIG. 28 is a schematic diagram illustrating a conversion result when the conversion rule illustrated in FIG. 27 is applied to the pattern image illustrated in FIG. 2 in a case where non-linearity is not present in a signal transmission path. Further, FIG. 29 is a schematic diagram illustrating a pattern image constituted of arrangement of partial images illustrated in FIG. 28. In a case where non-linearity is not present in a signal transmission path, a geometric pattern as illustrated in FIG. 29 is formed. Also in such an example, a person in charge of inspection can easily determine presence or absence of non-linearity in a signal transmission path only by checking whether the pattern illustrated in FIG. 29 is displayed on the display unit 203, or a pattern different from the pattern illustrated in FIG. 29 is displayed on the display unit 203.

Second Embodiment

In the first embodiment, at a time of inspection, the conversion unit 202 performs conversion of a part of gradation level values included in an image signal received by the image signal reception unit 201. In contrast, in the present embodiment, a conversion unit 202 converts all gradation level values included in an image signal received by an image signal reception unit 201.

Specifically, the conversion unit 202 according to the present embodiment converts the gradation level value to be converted in accordance with a conversion rule selected depending on which term of an arithmetic progression among M types of different arithmetic progressions the gradation level value to be converted corresponds to. Herein, M types of different arithmetic progressions are arithmetic progressions in each of which a common difference is M. Specifically, each gradation level value from a lower limit inspection gradation level value to an upper limit inspection gradation level value corresponds to either term of M types of arithmetic progressions. Note that, M is a predetermined integer of 2 or more. The conversion unit 202 performs conversion by using either of M types of different predetermined conversion rules according to which term of arithmetic progressions, a gradation level value to be converted corresponds to. Specifically, a conversion rule candidate to be selected is M types of different predetermined conversion rules.

In the following, for easy understanding, it is assumed that a value of M is 2. Specifically, the conversion unit 202 performs conversion by using either of two types of conversion rules depending on which term of an arithmetic progression among two types of different arithmetic progressions a gradation level value to be converted corresponds to. These arithmetic progressions are arithmetic progressions in each of which a common difference is 2. Specifically, the two types of different arithmetic progressions are an arithmetic progression representing an even number, and an arithmetic progression representing an odd number.

FIG. 30 is a table illustrating one example of a conversion rule according to the second embodiment. The table illustrated in FIG. 30 includes two types of conversion rules being a first conversion rule and a second conversion rule.

Specifically, the first conversion rule is a conversion rule to be applied in a case where a gradation level value to be converted, specifically, a gradation level value to be input to the conversion unit 202 is an even number. The conversion rule is a conversion rule in which a gradation level value is changed to 0. In other words, the first conversion rule is a conversion rule to be selected in association with an arithmetic progression representing an even number, and is a rule for uniformly converting a gradation level value to be converted into a predetermined first gradation level value.

The second conversion rule is a conversion rule to be applied in a case where a gradation level value to be converted, specifically, a gradation level value to be input to the conversion unit 202 is an odd number. The conversion rule is a conversion rule in which a gradation level value is changed to 255. In other words, the second conversion rule is a conversion rule to be selected in association with an arithmetic progression representing an odd number, and is a rule for uniformly converting a gradation level value to be converted into a predetermined second gradation level value.

Note that, one of the first gradation level value and the second gradation level value is, for example, a minimum value of sequential N-stage gradation levels, and the other is a maximum value of the sequential N-stage gradation levels.

In this way, in the example illustrated in FIG. 30, the conversion unit 202 converts all gradation level values included in an image signal received by the image signal reception unit 201 by using a conversion rule in which an even-numbered gradation level value is changed to 0, and a conversion rule in which an odd-numbered gradation level value is changed to 255.

Figure 31:
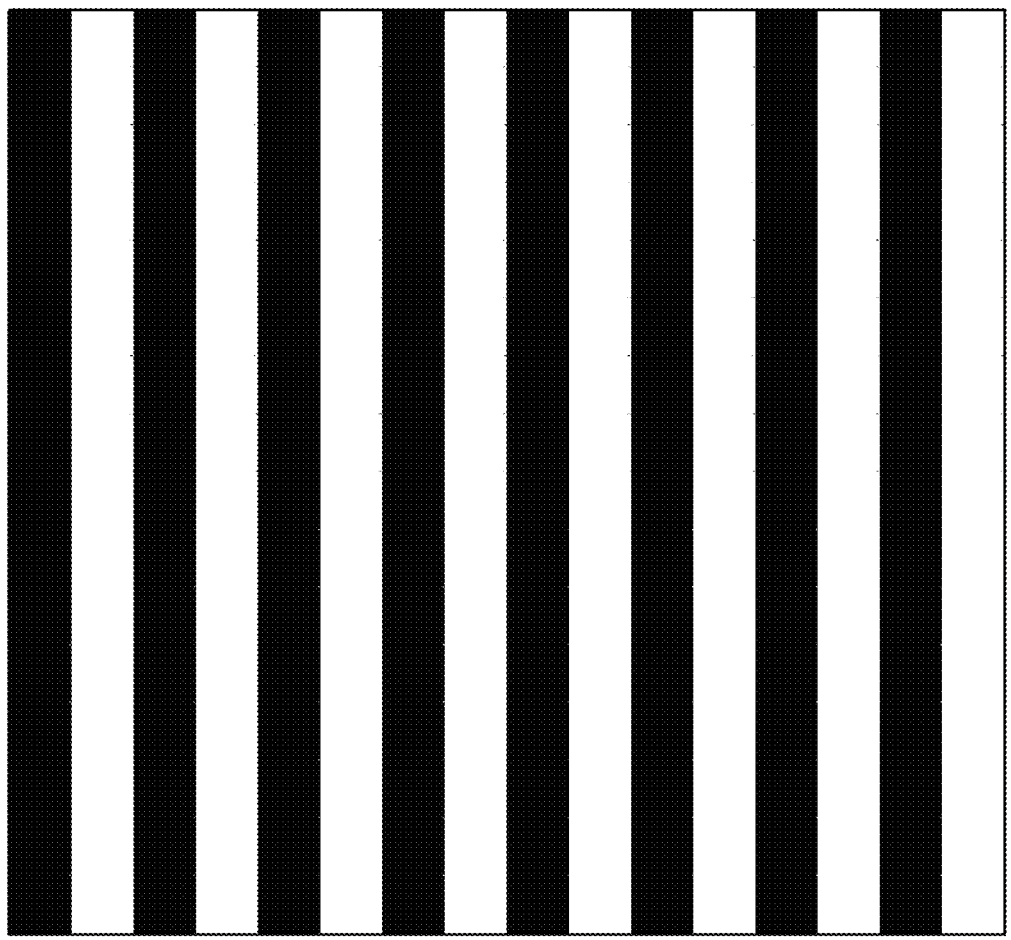
FIG. 31 is a schematic diagram illustrating a pattern image when the conversion rule illustrated in FIG. 30 is applied to the pattern image illustrated in FIG. 2 in a case where non-linearity is not present in a signal transmission path.

FIG. 31 is a schematic diagram illustrating a pattern image when the conversion rule illustrated in FIG. 30 is applied to the pattern image illustrated in FIG. 2 in a case where non-linearity is not present in a signal transmission path. In a case where non-linearity is not present in a signal transmission path, as illustrated in FIG. 31, a complete striped pattern is formed by a partial image group in which gradation level values arranged in a vertical direction are 0, and a partial image group in which gradation level values arranged in a vertical direction are 255.

Also in the present embodiment, similarly to the first embodiment, in a case where a change in gradation level value occurs due to non-linearity in a signal transmission path, the pattern illustrated in FIG. 31 collapses. In this way, since a small change in gradation level value is represented as a change of a pattern, visual recognition is easy. Specifically, a person in charge of inspection can easily determine presence or absence of non-linearity in a signal transmission path only by checking whether the pattern illustrated in FIG. 31 is displayed on a display unit 203, or a pattern different from the pattern illustrated in FIG. 31 is displayed on the display unit 203.

Also in the present embodiment, a pattern image may be an image in which N partial images having a different gradation level value are regularly arranged. Therefore, similarly to the first embodiment, various variations are available for arrangement of each gradation level value in a pattern image.

Further, also in the present embodiment, in a case where non-linearity is not present in a signal transmission path, a conversion rule may be a conversion rule in which a predetermined pattern (e.g., a geometric pattern) is applied to a pattern image, and is not limited to the above-described specific example. For example, the first conversion rule may be a conversion rule in which an even-numbered gradation level value is changed to 255, and the second conversion rule may be a conversion rule in which an odd-numbered gradation level value is changed to 0. Further, a gradation level value to be set by changing may not be a minimum value and a maximum value of sequential N-stage gradation levels. Specifically, a gradation level value to be set by changing may be any predetermined value in a range from a minimum value to a maximum value. In this way, each conversion rule is, for example, a rule for uniformly converting a gradation level value to be converted into a predetermined gradation level value. In other words, the conversion unit 202 converts all gradation level values into either of M types of gradation level values. However, the conversion rule is not limited to such a conversion rule.

For example, also in the present embodiment, the conversion rule may be a rule for performing conversion in which an input gradation level value is shifted by a predetermined level value. Specifically, the conversion rule may be a rule for performing conversion in which a predetermined level value is added to or subtracted from an input gradation level value.

FIG. 32 is a table illustrating one example of a conversion rule in which a gradation level value is shifted by a predetermined level value. The conversion rule according to the example illustrated in FIG. 32 is a conversion rule in which −64 is added to an even-numbered gradation level value, and 64 is added to an odd-numbered gradation level value. However, in a case where a value after addition falls below 0, 256 is added to the addition result, and in a case where a value after addition exceeds 255, 256 is subtracted from the addition result. Specifically, wrap-around computation is performed.

In this case, in a case where a gradation level value to be input to the conversion unit 202 is an even number, the conversion unit 202 adds −64 to the input value, and outputs a gradation level value acquired by performing wrap-around computation. Further, in a case where a gradation level value to be input to the conversion unit 202 is an odd number, the conversion unit 202 adds 64 to the input value, and outputs a gradation level value acquired by performing wrap-around computation. Note that, in the example illustrated in FIG. 32, an absolute value of a value to be added to an even-numbered gradation level value, and an absolute value of a value to be added to an odd-numbered gradation level value are same. However, these values may be different from each other.

Figure 34:
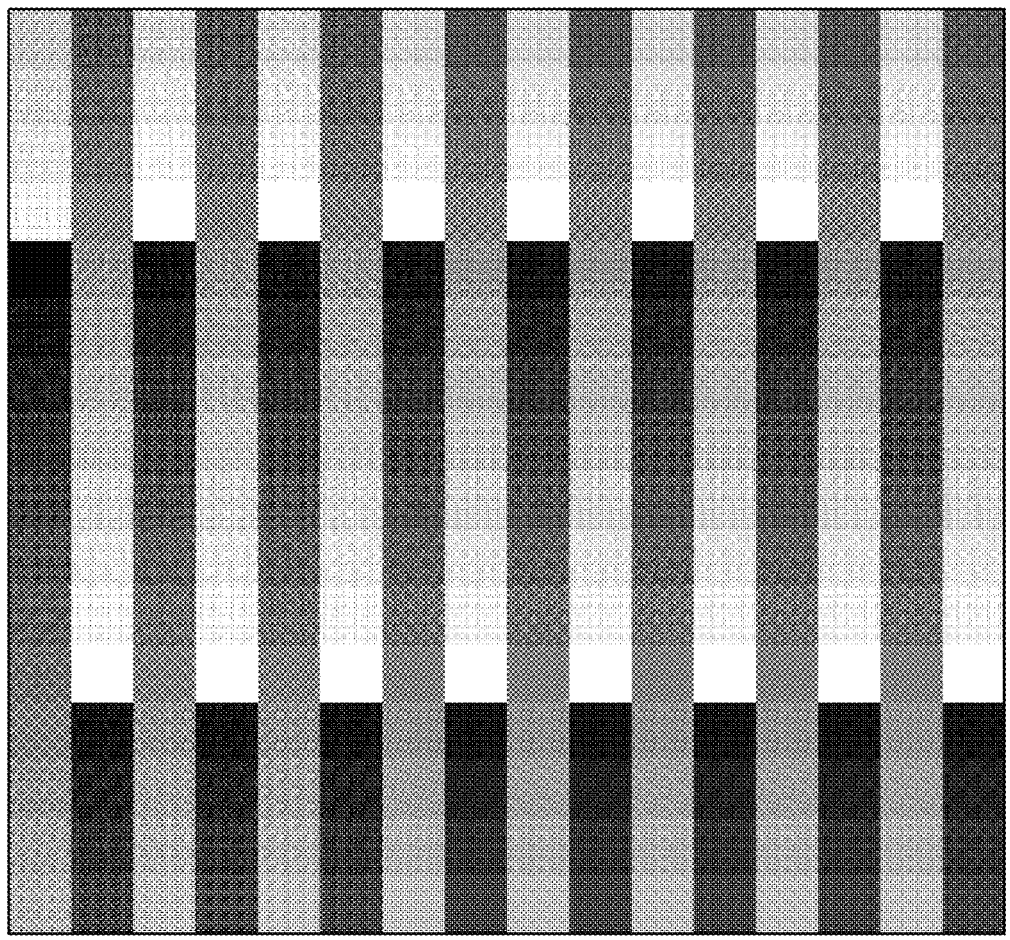
FIG. 34 is a schematic diagram illustrating a pattern image constituted of arrangement of partial images illustrated in FIG. 33.

FIG. 33 is a schematic diagram illustrating a pattern image when the conversion rule illustrated in FIG. 32 is applied to the pattern image illustrated in FIG. 2 in a case where non-linearity is not present in a signal transmission path. Further, FIG. 34 is a schematic diagram illustrating a pattern image constituted of arrangement of partial images illustrated in FIG. 33. In a case where non-linearity is not present in a signal transmission path, a geometric pattern as illustrated in FIG. 34 is formed. Also in such an example, a person in charge of inspection can easily determine presence or absence of non-linearity in a signal transmission path only by checking whether the pattern illustrated in FIG. 34 is displayed on the display unit 203, or a pattern different from the pattern illustrated in FIG. 34 is displayed on the display unit 203.

Third Embodiment

Next, a third embodiment is described. In the above-described embodiment, one pattern image is used in which a plurality of partial images in which a gradation level value sequentially changes are arranged on an image plane. In contrast, in the present embodiment, a plurality of images in which a gradation level value sequentially changes are used. Specifically, in the above-described embodiment, determination of presence or absence of non-linearity is performed by displaying one pattern image on the display unit 203. In the present embodiment, determination is performed by successively displaying a plurality of images on a display unit 203.

In the following, details of the third embodiment are described. However, description of a configuration and a processing content similar to the above-described embodiment is omitted as necessary.

Figure 35:
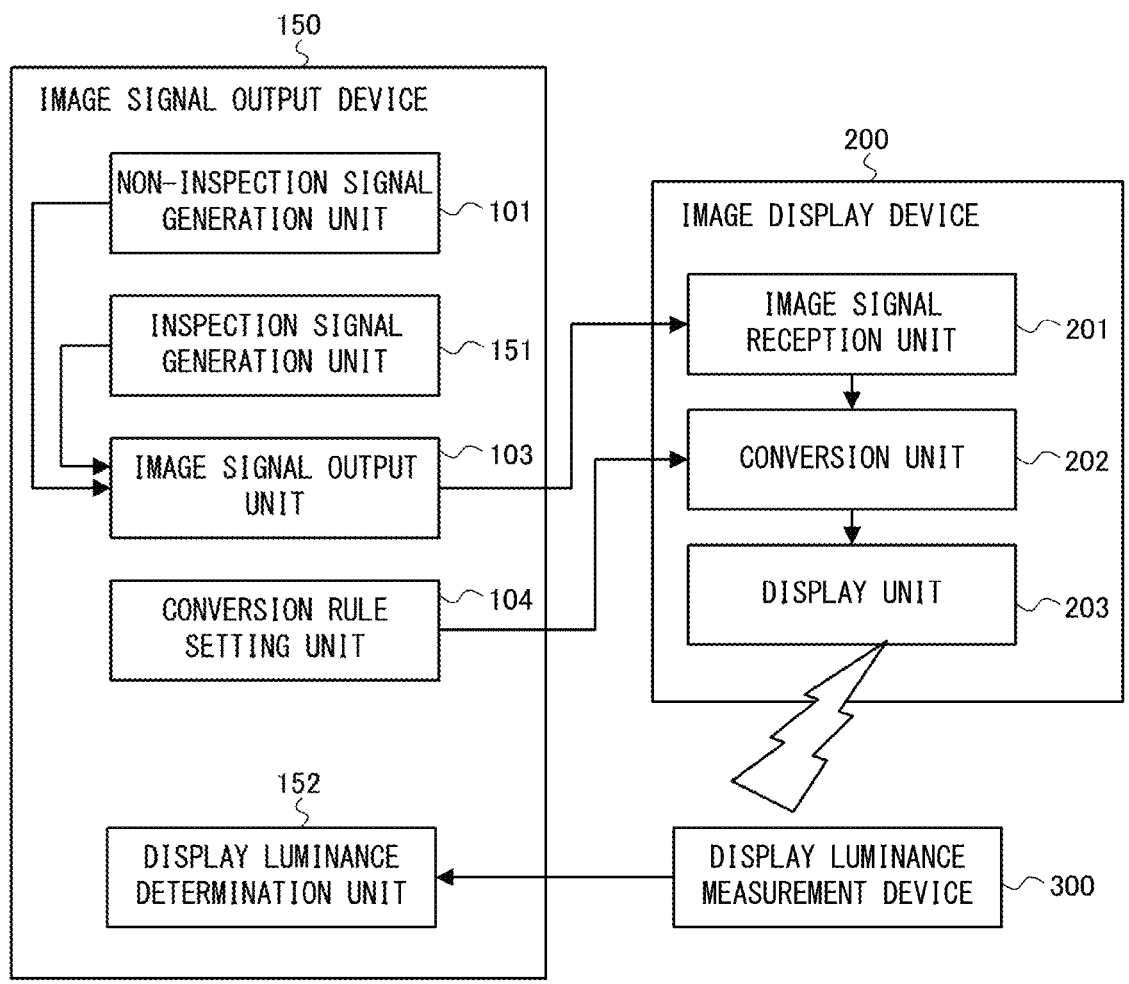
FIG. 35 is a block diagram illustrating one example of a configuration of an image display system according to a third embodiment.

FIG. 35 is a block diagram illustrating one example of a configuration of an image display system 30 according to the third embodiment. As illustrated in FIG. 35, the image display system 30 includes an image signal output device 150, an image display device 200, and a display luminance measurement device 300.

Also in the present embodiment, the image signal output device 150 and the image display device 200 are communicably connected to each other wiredly or wirelessly. Further, the display luminance measurement device 300 and the image signal output device 150 are communicably connected to each other wiredly or wirelessly.

The image signal output device 150 is different from the image signal output device 100 according to the above-described embodiment in a point that the inspection signal generation unit 102 is replaced by an inspection signal generation unit 151, and a display luminance determination unit 152 is added.

The display luminance determination unit 152 is, for example, achieved by software. In this case, the display luminance determination unit 152 is achieved by causing a processor included in the image signal output device 150 to execute a program including one or more commands stored in a memory and the like. Note that, the display luminance determination unit 152 may be provided in the image display device 200 or another device, in place of the image signal output device 150.

The display luminance measurement device 300 is a sensor for measuring luminance of an image displayed on the display unit 203. The display luminance measurement device 300 quantifies luminance of an image displayed on the display unit 203 for output to the image signal output device 150. A measurement result of the display luminance measurement device 300 is input to the display luminance determination unit 152 of the image signal output device 150. The display luminance measurement device 300 measures luminance, on a screen of the display unit 203, at least in an area in which an image represented by an image signal generated by the inspection signal generation unit 151 is displayed. The display luminance measurement device 300 is installed by, for example, being fixed to an end of a screen and the like. However, the display luminance measurement device 300 may not be necessarily fixedly installed on the image display device 200. Specifically, for example, measurement of luminance of an image represented by an image signal generated by the inspection signal generation unit 151 may be performed by allowing a person in charge of inspection to hold the display luminance measurement device 300 by hand.

Similarly to the inspection signal generation unit 102, the inspection signal generation unit 151 also generates an image for displaying on the image display device 200 at a time of inspection, specifically, an image signal of an image for inspecting presence or absence of non-linearity of an input/output characteristic in a signal transmission path. In the following, description of the inspection signal generation unit 151 that overlaps description of the inspection signal generation unit 102 is omitted as necessary.

The inspection signal generation unit 151 successively generates an image signal of N images (where N is an integer of 2 or more) having a different gradation level value. Herein, a gradation level of the n-th image to be generated (where n is an integer being not less than 1 and not more than N) among N images is the n-th gradation level of sequential N-stage gradation levels. In other words, a gradation level of an image for the n-th indication is the n-th gradation level of sequential N-stage gradation levels. The sequential N-stage gradation levels are as described in the description of the first embodiment.

For example, the inspection signal generation unit 151 successively generates an images signal of N images in such a way that an order of gradation level values becomes an ascending order. Specifically, for example, first, the inspection signal generation unit 151 generates an image signal of a uniform image in which a gradation level value is 0, and then, generates an image signal of a uniform image in which a gradation level value is 1. The inspection signal generation unit 151 generates an image signal in a similar manner thereafter. Note that, the inspection signal generation unit 151 may successively generate an image signal of N images in such a way that an order of gradation level values becomes a descending order. A gradation level of the n-th image to be output among N images successively output from the image signal output device 150 at a time of inspection is the n-th gradation level of sequential N-stage gradation levels. In other words, a gradation level of the n-th image to be input to the image display device 200 is the n-th gradation level of sequential N-stage gradation levels.

The inspection signal generation unit 151 outputs a generated image signal to an image signal output unit 103. The inspection signal generation unit 151 may switch an image signal to be output to the image signal output unit 103 at every predetermined display time, or may switch an image signal to be output to the image signal output unit 103, based on an instruction from a user. Specifically, output of an image having a next gradation level value may be automatically performed, or may be performed based on an instruction from a user. An image signal generated by the inspection signal generation unit 151 is output to the image display device 200 by the image signal output unit 103. An image signal output from the image signal output device 150 is received by an image signal reception unit 201 of the image display device 200, and thereafter, input to a conversion unit 202.

At a time of inspection, similarly to the first embodiment or the second embodiment, the conversion unit 202 converts a gradation level value included in an image signal received by the image signal reception unit 201 in accordance with a predetermined conversion rule. Note that, in the present embodiment, similarly to the first embodiment, the conversion unit 202 may convert a part of gradation level values included in an image signal received by the image signal reception unit 201, or similarly to the second embodiment, convert all gradation level values. Further, in the present embodiment, either of the conversion methods described in the description of the first embodiment and the second embodiment may be employed. Therefore, for example, the conversion unit 202 may convert a gradation level value corresponding to a term of a predetermined arithmetic progression in accordance with a conversion rule associated with the arithmetic progression. Further, the predetermined arithmetic progression may be plural arithmetic progressions. Specifically, a different conversion rule may be associated with each arithmetic progression. Further, the conversion rule may be a rule for uniformly converting a gradation level value to be converted into a predetermined gradation level value, or may be a rule for performing conversion in which a gradation level value is shifted by a predetermined level value.

In the first embodiment or the second embodiment, in a case where non-linearity is present in a signal transmission path, a regular two-dimensional pattern appearing in a case where non-linearity is not present in a signal transmission path collapses. In contrast, in the present embodiment, in a case where non-linearity is present in a signal transmission path, a regular chronological change of luminance appearing in a case where non-linearity is not present in a signal transmission path collapses. Specifically, since a small change in gradation level value in a signal transmission path is represented as fluctuation of a regular chronological change of luminance, visual recognition is easy. Note that, in the present embodiment, as will be described later, determination processing by equipment is performed by the display luminance measurement device 300 and the display luminance determination unit 152. However, similarly to the first embodiment or the second embodiment, visual determination by a person in charge of inspection is also available. In this case, it is possible to omit the display luminance measurement device 300 and the display luminance determination unit 152.

In the present embodiment, specifically, at a time of inspection, the conversion unit 202 employs a conversion rule for converting a progression in which a gradation level value sequentially changes into a progression in which a gradation level value repeats an increase and a decrease. As such a conversion rule, for example, the conversion rule illustrated in FIG. 4 can be employed. However, a conversion rule is not limited to the conversion rule. It is possible to employ the other conversion rule and the like described in description of the first embodiment or the second embodiment.

Note that, for example, in a case where a conversion rule in which an odd-numbered gradation level value is changed to 0 is employed, when an image having a gradation level value of 0, and an image having a gradation level value of 1 are input to the conversion unit 202 in order, an image having a gradation level value of 0 is sequentially displayed. Specifically, the conversion rule is not, in a strict sense, a conversion rule for converting into a progression in which a gradation level value repeats an increase and a decrease. However, in the present disclosure, a progression in which a gradation level value does not repeat an increase and a decrease in a part of a progression after conversion is also referred to as a progression in which a gradation level value repeats an increase and a decrease. Further, when description is made taking into consideration the above-described strictness, it can be said that the conversion unit 202 employs a conversion rule for converting a progression in which a gradation level value sequentially changes into a progression in which a gradation level value repeats an increase and a decrease in consecutive terms in a predetermined range.

An image signal output from the conversion unit 202 is displayed on the display unit 203. Then, luminance of a grayscale image displayed on the display unit 203 is measured by the display luminance measurement device 300, and the luminance is transmitted to the display luminance determination unit 152.

The display luminance determination unit 152 determines whether luminance measured by the display luminance measurement device 300 repeats an increase and a decrease. Specifically, the display luminance determination unit 152 determines whether luminance changes in such a way as to repeat an increase and a decrease according to an image signal to be successively output from the image signal output device 150. In a case where measured luminance repeats an increase and a decrease, specifically, in a case where there is a regular chronological change of luminance, this means that gradation level values of sequential images successively output from the image signal output device 150 are input to the conversion unit 202 as they are without value fluctuation. On the other hand, in a case where measured luminance does not repeat an increase and a decrease, specifically, in a case where fluctuation occurs in a regular chronological change of luminance, this means that gradation level values of sequential images successively output from the image signal output device 150 are input to the conversion unit 202 with value fluctuation.

The display luminance determination unit 152 determines that non-linearity is not present in a signal transmission path, in a case where a series of measured luminances with respect to a series of sequential images from a lower limit (upper limit) inspection gradation level value to an upper limit (lower limit) inspection gradation level value output from the image signal output device 150 repeat an increase and a decrease.

On the other hand, the display luminance determination unit 152 determines that non-linearity is present in a signal transmission path, in a case where a series of measured luminances with respect to a series of sequential images from a lower limit (upper limit) inspection gradation level value to an upper limit (lower limit) inspection gradation level value output from the image signal output device 150 do not repeat an increase and a decrease.

Note that, as described above, in a strict sense, there is a case that a conversion rule that cannot be said to be a conversion rule for converting a progression in which a gradation level value sequentially changes into a progression in which a gradation level value repeats an increase and a decrease. In this case, the display luminance determination unit 152 may determine whether measured luminance repeats an increase and a decrease regarding a predetermined series among a series of sequential images from a lower limit (upper limit) inspection gradation level value to an upper limit (lower limit) inspection gradation level value output from the image signal output device 150.

Figure 36:
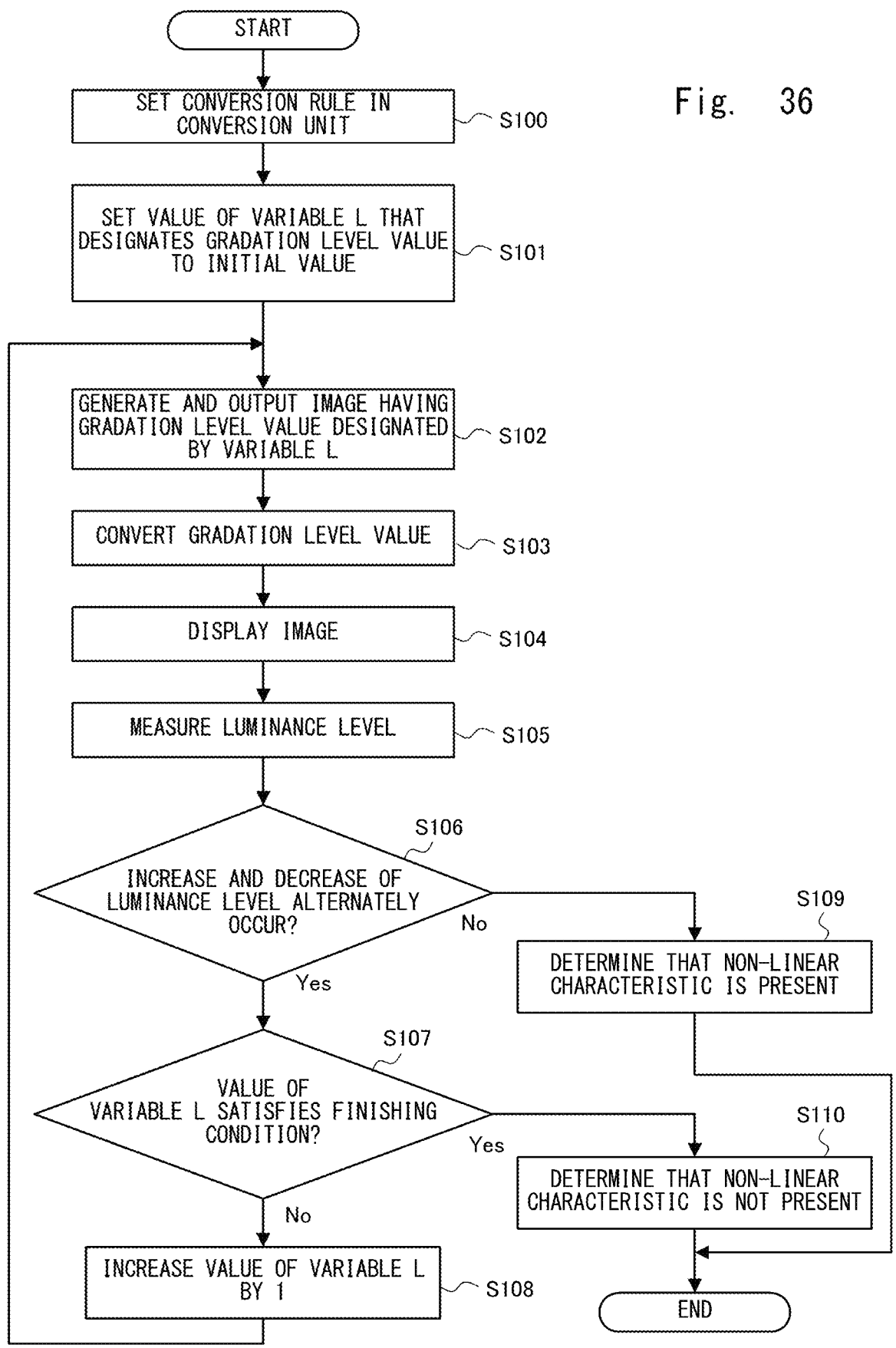
FIG. 36 is a flowchart illustrating one example of an operation of the image display system according to the third embodiment.

FIG. 36 is a flowchart illustrating one example of an operation of the image display system 30 according to the third embodiment. In the following, a flow of an operation of the image display system 30 at a time of inspection is described along with FIG. 36.

In Step S100, a conversion rule setting unit 104 sets an inspection conversion rule in the conversion unit 202. Note that, the conversion rule employed herein is a conversion rule for converting a progression in which a gradation level value sequentially changes into a progression in which a gradation level value repeats an increase and a decrease.

Next, in Step S101, the inspection signal generation unit 151 sets a value of a variable L to an initial value. Herein, the variable L is a variable that designates a gradation level value of an image for displaying on the image display device 200 at a time of inspection. For example, the inspection signal generation unit 151 sets, in the variable L, a lower limit inspection gradation level value (e.g., 0), as an initial value.

Next, in Step S102, the inspection signal generation unit 151 generates an image signal of an image having a gradation level value designated by the variable L. Then, the image signal output unit 103 outputs the generated image signal to the image display device 200. Then, the signal is received by the image signal reception unit 201.

Next, in Step S103, the conversion unit 202 performs conversion processing of the gradation level value of the image signal received by the image signal reception unit 201 in accordance with the conversion rule set in Step S100.

Next, in Step S104, the display unit 203 displays an image, based on the image signal after conversion in Step S103.

Next, in Step S105, luminance of the image displayed on the display unit 203 in Step S104 is measured by the display luminance measurement device 300. Then, the measurement result is transmitted to the display luminance determination unit 152.

Next, in Step S106, the display luminance determination unit 152 determines whether a series of measured luminance values chronologically and alternately repeat an increase and a decrease. Specifically, the display luminance determination unit 152 determines whether an increase and a decrease of luminance chronologically and alternately occur. In other words, the display luminance determination unit 152 determines whether a pattern of chronological data of a series of measured luminance values is in conformity with a data pattern in which an increase and a decrease are alternately repeated.

Note that, in a case where a value of the variable L is an initial value, the number of luminance data acquired as a measurement result is one. Therefore, the above-described processing in the present determination step is omitted, and processing proceeds to Step S107. Further, also in a case where the display luminance determination unit 152 determines that a value of the variable L is not an initial value, and a pattern of chronological data of a series of measured luminance values is in conformity with a data pattern in which an increase and a decrease are alternately repeated, processing proceeds to Step S107. Further, in a case where a value of the variable L is not an initial value, and a pattern of chronological data of a series of measured luminance values is not in conformity with a data pattern in which an increase and a decrease are alternately repeated, processing proceeds to Step S109.

In Step S107, the inspection signal generation unit 151 determines whether a value of the variable L satisfies a predetermined finishing condition. For example, the inspection signal generation unit 151 determines whether a value of the variable L is equal to an upper limit inspection gradation level value (e.g., 255). In a case where a value of the variable L does not satisfy the finishing condition, processing proceeds to Step S108. On the other hand, in a case where a value of the variable L satisfies the finishing condition, processing proceeds to Step S110.

In Step S108, the inspection signal generation unit 151 increases a current value of the variable L by 1. Note that, in the example illustrated in FIG. 36, a gradation level value is set in an ascending order. Alternatively, a gradation level value may be set in a descending order. In this case, in Step S108, the inspection signal generation unit 151 decreases a current value of the variable L by 1. After Step S108, processing returns to Step S102.

In Step S109, the display luminance determination unit 152 determines that a non-linear characteristic is present in a signal transmission path, and finishes the inspection.

On the other hand, in Step S110, the display luminance determination unit 152 determines that a non-linear characteristic is not present in a signal transmission path, and finishes the inspection.

In the foregoing, the third embodiment has been described. As described above, in the present embodiment, a series of images output by chronologically and sequentially changing a gradation level value are successively output to the display unit 203 via the conversion unit 202. Then, in a case where non-linearity is present in a signal transmission path, a regular chronological change of luminance of an image to be displayed on the display unit 203 fluctuates. Therefore, by allowing equipment or a person in charge of inspection to detect the fluctuation, presence or absence of non-linearity of an input/output characteristic in a signal transmission path can be easily checked.

Note that, the present invention is not limited to the above-described embodiments, and can be modified as necessary as far as a modified example does not deviate from the gist. For example, in each of the above-described embodiments, display of a numerical value indicating a gradation level value set in the inspection signal generation unit 102 or 151 may be superimposed on an image for displaying on the image display device 200 at a time of inspection. Specifically, the inspection signal generation unit 102 may superimpose, on each partial image constituting a pattern image, a gradation level value of a partial image. Further, the inspection signal generation unit 151 may superimpose, on each of a series of images for inspection, a gradation level value of the image. Note that, a gradation level value of a character to be superimposed is a gradation level value having a contrast difference of a predetermined value or more with respect to a background image. By setting as described above, a gradation level value set in the image signal output device 100 can be checked on the display unit 203. Thus, a person in charge of inspection can easily recognize which gradation level value is affected by a non-linear characteristic.

Meanwhile, generally, a function for adjusting a display characteristic, and a function of inspecting a display characteristic are loaded in a commercial monitor product such as a medical monitor. Specifically, as a function for adjusting a display characteristic, a function for making a gamma characteristic of a display coincident with a gamma characteristic in compliance with medical standards is loaded. More specifically, a LUT is loaded in a monitor body, and software for applying a desired gamma characteristic to the LUT is prepared. Then, by operating the software to generate LUT data for achieving the desired gamma characteristic, and writing the LUT data in the LUT incorporated in the monitor body with use of a communication function of the software, adjustment can be performed in such a way as to achieve the desired gamma characteristic. Further, a function of inspecting a failure of a display characteristic by displaying a test pattern by the software and viewing the test pattern is loaded as a function of inspecting a display characteristic.

The above-described embodiment may be achieved by utilizing a function for adjusting a display characteristic, and a function of inspecting a display characteristic, which are provided in advance in a monitor product. By the above configuration, it is possible to suppress an introduction cost of the above-described embodiment. Specifically, the inspection signal generation unit 102 or 151 may be achieved by utilizing software loaded in advance in a monitor, as a function of inspecting a display characteristic. Further, the conversion unit 202 may be achieved by utilizing a LUT for gamma characteristic generation, which is loaded in advance in a monitor, as a function for adjusting a display characteristic. Further, the conversion rule setting unit 104 may be achieved by utilizing software, which is loaded in advance in a monitor, as a function for adjusting a display characteristic.

The above-described program is stored by using various types of non-transitory computer readable media, and can be supplied to a computer. The non-transitory computer readable media include various types of tangible storage media. Examples of the non-transitory computer readable media include a magnetic recording medium (e.g., a flexible disk, a magnetic tape, and a hard disk drive), an opto-magnetic recording medium (e.g., an opto-magnetic disk), a compact disc read only memory (CD-ROM), a CD-R, a CD-R/W, and a semiconductor memory (e.g., a mask ROM, a programmable ROM (PROM), an erasable PROM (EPROM), a flash ROM, and a random access memory (RAM)). Further, the program may be supplied to a computer by various types of transitory computer readable media. Examples of the transitory computer readable media include an electric signal, an optical signal, and an electromagnetic wave. The transitory computer readable media can supply the program to a computer via a wired communication path such as an electrical wire and an optical fiber, or a wireless communication path.

What is claimed is:

1. An image display device comprising:
   an image signal reception circuit configured to receive an image signal of a pattern image in which N partial images (where N is an integer of 2 or more) having a different gradation level value are regularly arranged;
   a conversion unit configured to convert at least a part of gradation level values included in the image signal into a gradation level value in accordance with a predetermined conversion rule; and
   a display unit configured to display by using an image signal that undergoes conversion by the conversion unit,
   wherein a gradation level value of an n-th partial image (where n is an integer being not less than 1 and not more than N) among the N partial images is an n-th gradation level value of sequential N-stage gradation levels,
   wherein the conversion unit is implemented by a table-type signal computer, a logic circuit, or a processor configured to execute instructions stored in a memory,
   wherein the display unit is implemented by a display or a projector, and
   wherein the predetermined conversion rule is:
   (a) a rule in which even or odd gradation level values are replaced by a predetermined first gradation level value, the predetermined first gradation level value being one of the N-stage gradation levels;
   (b) a rule for adding or subtracting N/2 to or from even or odd gradation level values, subtracting N from the added level value if the added level value is N or more, and adding N to the subtracted level value if the subtracted level value is less than 0;
   (c-1) a rule for replacing even gradation level values being less than N/2 into N−1, and replacing even gradation level values being not less than N/2 into 0; or
   (c-2) a rule for replacing odd gradation level values being less than N/2 into N−1, and replacing odd gradation level values being not less than N/2 into 0.

2. The image display device according to claim 1, wherein the predetermined first gradation level value is a minimum value or a maximum value of the sequential N-stage gradation levels.

3. An inspection method comprising:
   receiving an image signal of a pattern image in which N partial images (where N is an integer of 2 or more) having a different gradation level value are regularly arranged;
   converting at least a part of gradation level values included in the image signal into a gradation level value in accordance with a predetermined conversion rule; and
   displaying by using an image signal that undergoes the conversion, wherein a gradation level value of an n-th partial image (where n is an integer being not less than 1 and not more than N) among the N partial images is an n-th gradation level value of sequential N-stage gradation levels, and wherein the predetermined conversion rule is:
  (a) a rule in which even or odd gradation level values are replaced by a predetermined first gradation level value, the predetermined first gradation level value being one of the N-stage gradation levels;
  (b) a rule for adding or subtracting N/2 to or from even or odd gradation level values, subtracting N from the added level value if the added level value is N or more, and adding N to the subtracted level value if the subtracted level value is less than 0;
  (c-1) a rule for replacing even gradation level values being less than N/2 into N−1, and replacing even gradation level values being not less than N/2 into 0; or
  (c-2) a rule for replacing odd gradation level values being less than N/2 into N−1, and replacing odd gradation level values being not less than N/2 into 0.

* * * * *